(12) United States Patent
Maaref et al.

(10) Patent No.: US 12,372,662 B2
(45) Date of Patent: Jul. 29, 2025

(54) MULTIPATH MITIGATION IN GNSS RECEIVERS WITH MACHINE LEARNING MODELS

(71) Applicant: oneNav, Inc., Palo Alto, CA (US)

(72) Inventors: Mahdi Maaref, Mountain View, CA (US); Lionel Garin, Palo Alto, CA (US); Paul McBurney, Palo Alto, CA (US)

(73) Assignee: oneNav, Inc., Sunnyvale, CA (US)

( * ) Notice: Subject to any disclaimer, the term of this patent is extended or adjusted under 35 U.S.C. 154(b) by 314 days.

(21) Appl. No.: 17/836,116

(22) Filed: Jun. 9, 2022

(65) Prior Publication Data

US 2023/0050047 A1 Feb. 16, 2023

Related U.S. Application Data

(60) Provisional application No. 63/243,028, filed on Sep. 10, 2021, provisional application No. 63/216,905, filed on Jun. 30, 2021.

(51) Int. Cl.
*G01S 19/23* (2010.01)
*G06N 3/045* (2023.01)

(52) U.S. Cl.
CPC .............. *G01S 19/23* (2013.01); *G06N 3/045* (2023.01)

(58) Field of Classification Search
CPC .......... G01S 19/23; G01S 19/22; G01S 19/35; G01S 19/40; G06N 3/045; G06N 3/0464; G06N 3/09
See application file for complete search history.

(56) References Cited

U.S. PATENT DOCUMENTS 5,717,406 A * 2/1998 Sanderford ............... G01S 5/14
342/363
9,562,770 B2 2/2017 Garin
(Continued)

FOREIGN PATENT DOCUMENTS

CN 112099058 A 12/2020
CN 112902989 A 6/2021
(Continued)

OTHER PUBLICATIONS

Hartrampf, Mark et al. "LION Navigator for Transfer to GEO Using Electric Propulsion." (Sep. 18, 2015), 18 pages, https://elib.dlr.de/100291/1/ION_15_F67_Hartrampf_LION_HEO.pdf.
(Continued)

*Primary Examiner* — Manuel A Rivera Vargas
(74) *Attorney, Agent, or Firm* — WOMBLE BOND DICKINSON (US) LLP

(57) ABSTRACT

Machine learning techniques are used, in one embodiment, to mitigate multipath in an L5 GNSS receiver. In one embodiment, training data is generated to provide ground truth data for excess path length (EPL) corrections for a set of received GNSS signals. A system extracts features from the set of received GNSS signals and uses the extracted features and the ground truth data to train a set of one or more neural networks that can produce EPL corrections for pseudorange measurements. The trained set of one or more neural networks can be deployed in GNSS receivers and used in the GNSS receivers to correct pseudorange measurements using EPL corrections provided by the trained set of neural networks.

18 Claims, 15 Drawing Sheets

(56) References Cited

U.S. PATENT DOCUMENTS

| | | |
|---|---|---|
| 9,945,956 B2* | 4/2018 | Chhokra ............... G01S 19/22 |
| 11,275,179 B1* | 3/2022 | Diggelen ............... G01S 19/37 |
| 11,402,514 B2 | 8/2022 | Sun et al. |
| 2005/0134440 A1 | 6/2005 | Breed |
| 2007/0200754 A1 | 8/2007 | Fuchs et al. |
| 2011/0182515 A1 | 7/2011 | Iwai et al. |
| 2012/0249367 A1 | 10/2012 | Bryant et al. |
| 2018/0324740 A1 | 11/2018 | Edge et al. |
| 2019/0257953 A1* | 8/2019 | Lennen ............... G01S 19/22 |
| 2019/0384304 A1 | 12/2019 | Towal et al. |
| 2020/0049837 A1* | 2/2020 | Werner ............... G06N 20/20 |
| 2020/0151288 A1 | 5/2020 | Ma et al. |
| 2020/0326430 A1 | 10/2020 | Nichols et al. |
| 2021/0041571 A1 | 2/2021 | Fischer et al. |
| 2021/0095965 A1 | 4/2021 | Zhao et al. |
| 2021/0302597 A1* | 9/2021 | Rezaei ............... G01S 19/51 |
| 2022/0066046 A1 | 3/2022 | Diggelen et al. |
| 2022/0066048 A1* | 3/2022 | Diggelen ............... G01S 19/37 |
| 2022/0066053 A1* | 3/2022 | Maggiolo ............... G01S 19/25 |
| 2022/0099841 A1* | 3/2022 | Farmer ............... G01S 19/22 |
| 2022/0107184 A1* | 4/2022 | Omr ............... G06T 7/277 |
| 2022/0137236 A1 | 5/2022 | Conflitti et al. |
| 2023/0057518 A1* | 2/2023 | Chen ............... G01S 19/25 |

FOREIGN PATENT DOCUMENTS

| | | |
|---|---|---|
| KR | 20200116729 A | 10/2020 |
| WO | 2020248200 A1 | 12/2020 |
| WO | 2021029869 A1 | 2/2021 |
| WO | 2021095270 A1 | 5/2021 |

OTHER PUBLICATIONS

Hauschild, André. "Chapter 20: Combination of Observations", in Springer Handbook of Global Navigation Satellite Systems, edited by Peter J.G. Teunissen and Oliver Montenbruck (Jul. 25, 2021), pp. 583-604, doi: 10.1007/978-3-319-42928-1.

Hoque, M. M., and N. Jakowski. "Ionospheric bending correction for GNSS radio occultation signals", Radio Science, vol. 46, RSOD06 (Jul. 6, 2011), 9 pages, doi: 10.1029/2010RS004583.

Najmafshar, M. et al. "Characterizing Ionospheric Scintillation for Future GNSS Radio Occultation Missions," Proceedings of the 28th International Technical Meeting of the Satellite Division of The Institute of Navigation (ION GNSS+ 2015), Tampa, Florida, Sep. 2015, pp. 3808-3818.

O'Brien, Andrew. "Adaptive Antenna Arrays for Precision GNSS Receivers." Doctoral dissertation, Ohio State University, 2009. http://rave.ohiolink.edu/etdc/view?acc_num=osu1259170076.

PCT International Search Report and Written Opinion from related PCT Application No. PCT/US2022/033560, mailed Nov. 4, 2022, 17 pages.

PCT International Preliminary Report on Patentability from related PCT Application No. PCT/US2022/033560, mailed Jan. 11, 2024, 13 pages.

PCT International Search Report and Written Opinion from related PCT Application No. PCT/US2022/033584, mailed Oct. 27, 2022, 11 pages.

PCT International Preliminary Report on Patentability from related PCT Application No. PCT/US2022/033584, mailed Jan. 11, 2024, 10 pages.

PCT International Preliminary Report on Patentability from related PCT Application No. PCT/US2022/033617, mailed Jan. 11, 2024, 20 pages.

Turetzky, G. et al. "A Pure L5 Mobile Receiver", Inside GNSS (Sep. 30, 2020), 4 pages, https://insidegnss.com/a-pure-l5-mobile-receiver/.

Xu, H. et al. Machine learning based LOS/NLOS classifier and robust estimator for GNSS shadow matching. Satell Navig 1:15 (May 11, 2020), 12 pages, https://doi.org/10.1186/s43020-020-00016-w.

Yuan, Zhenyu et al. "Hybrid-DNNs: Hybrid Deep Neural Networks for Mixed Inputs", May 2020, 14 pages.

Examination report No. 1 from related Australian Patent Application No. 2022303020, dated Aug. 16, 2024, 4 pages.

Hoque, Mainul and Jakowski, N. "Estimate of higher order ionospheric errors in GNSS positioning", Radio Science, vol. 43, RS5008, doi: 10.1029/2007RS003817, Oct. 9, 2008 (15 pages).

PCT International Search Report and Written Opinion from related PCT Application No. PCT/US2022/33617, mailed Sep. 12, 2022 (22 pages).

A. A. Abdallah and Z. M. Kassas, "Deep Learning-Aided Spatial Discrimination for Multipath Mitigation," 2020 IEEE/ ION Position, Location and Navigation Symposium (PLANS) (Apr. 20-23, 2020), pp. 1324-1335, doi: 10.1109/PLANS46316.2020.9109935.

F. Dovis, R. Imam, W. Qin, C. Savas and H. Visser, "Opportunistic use of GNSS Signals to Characterize the Environment by Means of Machine Learning Based Processing," ICASSP 2020—2020 IEEE International Conference on Acoustics, Speech and Signal Processing (ICASSP) (May 4-8, 2020), pp. 9190-9194, doi: 10.1109/ICASSP40776.2020.9052924.

B. Guermah, H. E. Ghazi, T. Sadiki and H. Guermah, "A Robust GNSS LOS/Multipath Signal Classifier based on the Fusion of Information and Machine Learning for Intelligent Transportation Systems," 2018 IEEE International Conference on Technology Management, Operations and Decisions (ICTMOD) (Nov. 21-23, 2018), pp. 94-100, doi: 10.1109/ITMC.2018.8691272.

L.T. Hsu, "GNSS multipath detection using a machine learning approach," 2017 IEEE 20th International Conference on Intelligent Transportation Systems (ITSC) (Oct. 2017), pp. 1-6, doi: 10.1109/ITSC.2017.8317700.

Munin, Evgenii & Blais, Antoine & Couellan, Nicolas. Convolutional Neural Network for Multipath Detection in GNSS Receivers. arXiv: 1911.02347v1 [eess.SP] (Nov. 6, 2019), pp. 1-10, https://doi.org/10.48550/arXiv.1911.02347.

M. Orabi, J. Khalife, A. A. Abdallah, Z. M. Kassas and S. S. Saab, "A Machine Learning Approach for GPS Code Phase Estimation in Multipath Environments," 2020 IEEE/ION Position, Location and Navigation Symposium (PLANS), (Apr. 20-23, 2020), pp. 1224-1229, doi: 10.1109/PLANS46316.2020.9110155.

Qin, Honglei & Xue, Xia & Yang, Qian. GNSS multipath estimation and mitigation based on particle filter. IET Radar, Sonar & Navigation, vol. 13, Issue 9 (Sep. 1, 2019), pp. 1588-1596. https://doi.org/10.1049/iet-rsn.2018.5587.

Quan Y, Lau L, Roberts GW, Meng X, Zhang C. Convolutional Neural Network Based Multipath Detection Method for Static and Kinematic GPS High Precision Positioning. Remote Sensing. (Dec. 17, 2018), 10(12):2052. https://doi.org/10.3390/rs10122052.

Savas, Caner, Dovis, Fabio, "Multipath Detection based on K-means Clustering," Proceedings of the 32nd International Technical Meeting of the Satellite Division of The Institute of Navigation (ION GNSS+ 2019), Miami, Florida (Sep. 16-20, 2019), pp. 3801-3811, https://doi.org/10.33012/2019.17028.

Suzuki, Taro, Nakano, Yusuke, Amano, Yoshiharu, "NLOS Multipath Detection by Using Machine Learning in Urban Environments," Proceedings of the 30th International Technical Meeting of the Satellite Division of The Institute of Navigation (ION GNSS+ 2017), Portland, Oregon (Sep. 2017), pp. 3958-3967. https://doi.org/10.33012/2017.15291.

Suzuki T, Amano Y. NLOS Multipath Classification of GNSS Signal Correlation Output Using Machine Learning. Sensors. (Apr. 3, 2021), 21(7):2503. https://doi.org/10.3390/s21072503.

Yozevitch, R., Moshe, B. B., and Weissman, A. A Robust GNSS LOS/NLOS Signal Classifier. J Inst Navig, 63:429-442. (May 2016) doi: 10.1002/navi.166.

Non-final Office Action mailed on Jan. 28, 2025, from U.S. Appl. No. 17/806,110, 21 pages.

Extended European Search Report from related European Application No. 22833895.0 mailed on Mar. 14, 2025, 10 pages.

Extended European Search Report from related European Application No. 22833893.5 mailed on Apr. 28, 2025, 10 pages.

Extended European Search Report from related European Application No. 22833897.6 mailed on Apr. 30, 2025, 11 pages.

(56) References Cited

OTHER PUBLICATIONS

Notice of Acceptance from related Australian Application No. 2022303020 mailed on May 1, 2025, 3 pages.

* cited by examiner

EPL Extraction with Pivot SV

EPL Extraction without pivot SV

MULTIPATH MITIGATION IN GNSS RECEIVERS WITH MACHINE LEARNING MODELS

BACKGROUND

This application claims the benefit of U.S. provisional patent application No. 63/243,028, which was filed Sep. 10, 2021 by Applicant oneNav, Inc. of Palo Alto, California and claims the benefit of U.S. provisional patent application No. 63/216,905, which was filed Jun. 30, 2021 by Applicant oneNav, Inc. of Palo Alto, California, and these provisional patent applications are hereby incorporated herein by reference.

This disclosure relates to the field of systems that determine position of a radio receiver, and in particular this disclosure relates to global navigation satellite system (GNSS) receivers, such as a GNSS receiver that can determine the position of the GNSS receiver from signals received from GNSS satellites (GNSS SVs).

Over the last few decades, the global navigation satellite systems have revolutionized our daily lives by providing the positioning and navigation services that play an important role in a variety of applications, spanning from transportation, agriculture, marine, and unmanned vehicles. As an example, the Uber Technologies, Inc., which is one of the pioneers in the smartphone-based transportation services and ride-hailing applications, is estimated to have over 93 million monthly active users worldwide.

GNSS receivers first reached the commercial domain in the early 1980s. By considerably rapid advancement in the technology, the GNSS receivers have been revolutionized through different generations. The first generation of truly mobile receivers were L1 C/A code only. The second generation started in approximately 2010, when the GLONASS GNSS system became modernized and reliable. The third generation of the GNSS receivers added support for the Galileo system launched by the European Union in 2011. The evolution to the fourth generation took some time as it added a new capability, i.e., to support for single sideband L5 receivers, where the Beidou constellation of SVs, the Galileo constellation of SVs, and the US GPS constellation of SVs all have modernized signals.

It is known that multipath effects on GNSS signals can cause large errors in position calculations in GNSS receivers. Multipath effects often occur in urban canyons where the same transmitted signal from a GNSS SV is reflected multiple times off surfaces of the buildings surrounding a street where a GNSS is located; diffraction effects can also occur causing a significantly polluted signal at the receiver. For example, the GNSS receiver in this case can receive both a line of sight (LOS) signal and multiple non-line of sight (NLOS) signals from the same SV. This can distort the pseudorange measurements made in the GNSS receiver, often to the point that the GNSS receiver measures a pseudorange that has significant error, resulting in a position solution that can be in error by more than 100 meters (100 m). This inaccuracy can result in situations in which a driver of a taxi service (e.g., Uber) is directed to the wrong side of the street by the GNSS receiver of the potential passenger who is waiting for the taxi service. This problem has been studied in the GNSS field, and many solutions have been proposed.

One solution uses a classifier to classify signals as either LOS or NLOS; in this solution, the goal is to ignore or reject the NLOS signal and use only the LOS signal, if available, in the pseudorange measurement. This solution has been achieved with different approaches, including the use of machine learning (e.g., a neural network used to classify the signals). If the LOS signal is not available, then the signal is ignored (so no pseudorange measurement of the signal is provided as an output from the GNSS receiver). Another solution is described in U.S. Pat. No. 9,562,770 (inventor: Lionel J. Garin); in this approach, a signal visibility database, that contains information about the size (e.g., height, width and length) of signal obstacles (e.g., buildings in an urban canyon), is used to determine expected line of sight signals and expected NLOS signals at locations along a pathway (e.g., street in the urban canyon). This approach can use ray tracing algorithms with a 3D building map and the exact location of the SVs (at any given time) to provide location information without attempting to measure pseudoranges at the GNSS receiver.

SUMMARY OF THE DESCRIPTION

Machine learning techniques are used in one embodiment to mitigate multipath in a GNSS receiver. In one embodiment, training data is generated to provide ground truth data for excess path length (EPL) corrections for a set of received GNSS signals. A system extracts features from the set of received GNSS signals and uses the extracted features and the ground truth data to train a model such as a set of one or more neural networks that can produce EPL corrections for pseudorange measurements. The trained set of one or more neural networks can be deployed in GNSS receivers and used in the GNSS receivers to correct pseudorange measurements using EPL corrections provided by the trained set of neural networks.

One embodiment can use two reference GNSS receivers and a GNSS receiver (referred to as a device under test (DUT) receiver) that is used with the reference GNSS receivers to generate the training data and to generate input data for use in training the model. The first reference GNSS receiver is stationary and positioned near the testing location (e.g., urban canyon environment) in an open sky condition at a very accurately known position and is used for correction of propagation and system errors that are common to the reference and DUT receivers, such as ionospheric errors, tropospheric errors, SV clock errors, orbit error, etc. The second reference GNSS receiver and the DUT are usually co-located on a vehicle and may share a GNSS antenna through a signal splitter. The second reference GNSS receiver is used as an accurate real-time source of location (thereby also providing the real-time accurate location of the DUT receiver). The second reference GNSS receiver can use an inertial navigation system (INS) to provide, once the INS is initialized with an accurate location, a source of instantaneous and dynamic accurate location of the DUT receiver (even in bad urban canyon situations) especially if the INS is high quality, and the INS which may be integrated within the second reference GNSS receiver. Knowing GNSS time, SV position, and DUT receiver position, and correcting DUT pseudorange measurements using corrections from the base receiver, the EPL can be computed (as the difference between the true range and the DUT's clock corrected pseudorange) after corrections from the first reference GNSS receiver.

A method according to one embodiment can include the following operations to operate a GNSS receiver that includes a trained a model to generate EPL corrections: receiving GNSS signals (e.g., L5 GNSS signals) from one or more GNSS SVs; extracting a set of features from the received GNSS signals, the set of features being predetermined based on a trained model in the GNSS receiver; applying the set of features as an input to the trained model; and generating, by the trained model, a set of one or more excess path length (EPL) corrections to correct one or more pseudorange measurements made by the GNSS receiver. In one embodiment, the trained model comprises a set of one or more neural networks, and the GNSS receiver is an L5 only GNSS receiver that does not use L1 GNSS signals to compute a position from GNSS signals, and wherein the L5 only GNSS receiver does not receive and does not acquire L1 GNSS signals. In one embodiment, each of the one or more pseudoranges is corrected by subtracting a corresponding EPL correction from a measured pseudorange from a GNSS SV, and wherein the GNSS signals are wideband GNSS signals that have a chipping rate that exceeds a chipping rate for L1 GPS signals, and wherein the measured pseudorange is measured in a delay locked loop (or other pseudorange estimator) in the GNSS receiver and wherein the one or more EPL corrections are derived based on outputs at the delay locked loop (DLL) which is a pseudorandom noise (PRN) tracking loop to track pseudoranges in the GNSS receiver (or based on outputs of a pseudorange estimator such as an open loop pseudorange estimator). In one embodiment, each of the one or more corrected pseudoranges is used in position solution calculations by a position engine, and wherein the set of one or more EPL corrections correct for multipath reflections of GNSS signals in an urban canyon that surrounds the GNSS receiver.

In one embodiment of a method for operating a GNSS receive with a trained model, the set of extracted features comprises: (1) correlation vector features from a set of successive correlation vectors from correlators, in the GNSS receiver, for GNSS signals from a GNSS SV; (2) a mutual probability distribution function (pdf) data of the relative delay and relative amplitude from each of the correlators; (3) other features relating to the GNSS receiver or GNSS SV. In one embodiment, the correlation vector features comprise one or more of: (1) relative amplitude of local maximum points in a correlation vector; (2) relative delay of peaks in a correlation vector; (3) a width of a strongest peak in a correlation vector; or (4) a number of strong peaks in a correlation vector. In one embodiment, the mutual pdf is in a 2D (two dimension) matrix format. In one embodiment, the other features comprise one or more of: (1) an elevation of a GNSS SV; (2) a signal to noise ratio (SNR) of a measured pseudorange; (3) a type of antenna used to receive the GNSS signals; (4) a tracking mode of the GNSS receiver; or (5) a tracking loop configuration of the GNSS receiver. In one embodiment, the set of one or more neural networks comprise: (1) a first convolution neural network (CNN) to receive as inputs the mutual pdf data; (2) a second CNN to receive as inputs the correlation vector features; and (3) a first neural network to receive the other features. In one embodiment, the method can include the further operations of: pruning data in the set of features; balancing data in the set of features; and scaling data in the set of features.

According to another aspect, a method for training a model for use in a GNSS receiver can include the following operations: receiving GNSS signals; generating training data for excess path length (EPL) corrections of measured pseudoranges from received GNSS signals; extracting a set of features from the received GNSS signals to create inputs to a model that is to be trained; training the model using the extracted set of features and the training data; and storing data representing the trained model for use in a GNSS receiver. In one embodiment, the trained model comprises a set of one or more neural networks, and the GNSS receiver is an L5 only GNSS receiver does not use L1 GNSS signals to compute a position from GNSS signals, and wherein the L5 only GNSS receiver does not receive and does not acquire L1 GNSS signals. In one embodiment, the set of features comprises: (1) correlation vector features from a set of successive correlation vectors from correlators, in the GNSS receiver, for GNSS signals from a GNSS SV; (2) a mutual probability distribution function (pdf) data of the relative delay and relative amplitude from each of the correlators; (3) other features relating to the GNSS receiver or GNSS SV; and wherein the training data is derived from outputs from a pseudorange measurement system such as a delay locked loop (DLL) which is a pseudorandom noise (PRN) tracking loop to track pseudoranges in a GNSS receiver used to receive the GNSS signals. In one embodiment, the correlation vector features comprise one or more of: (1) relative amplitude of local maximum points in a correlation vector; (2) relative delay of peaks in a correlation vector; (3) a width of a strongest peak in a correlation vector; or (4) a number of strong peaks in a correlation vector. In one embodiment, the mutual PDF is in a 2D (two dimension) matrix format. In one embodiment, the other features comprise one or more of: (1) an elevation of a GNSS SV; (2) a signal to noise ratio (SNR) of a measured pseudorange; (3) a type of antenna used to receive the GNSS signals; (4) a tracking mode of the GNSS receiver; or (5) a tracking loop configuration of the GNSS receiver. In one embodiment, the set of one or more neural networks comprise: (1) a first convolution neural network (CNN) to receive as inputs the mutual pdf data; (2) a second CNN to receive as inputs the correlation vector features; and (3) a first neural network to receive the other features. In one embodiment, the training method can further include the operations of: pruning data in the set of features; balancing data in the set of features; and scaling data in the set of features.

According to another aspect of this disclosure, a GNSS receiver can include the following components: an antenna to receive GNSS signals from GNSS SVs; an RF front end coupled to the antenna to amplify the GNSS signals; an analog to digital converter (ADC) coupled to the RF front end to generate a digital representation of received GNSS signals; a baseband memory coupled to the ADC to store the digital representation; a GNSS processing system coupled to the baseband memory to process the received GNSS signals, the GNSS processing system including a set of correlators that provide outputs that include correlation vectors; wherein the GNSS processing system includes processing logic to extract a set of features from the received GNSS signals, the set of features being predetermined based on a trained model in the GNSS receiver; wherein the GNSS processing system includes processing logic to apply the set of features as an input to the trained model; and wherein the GNSS processing system includes processing logic to generate, by the trained model, a set of one or more excess path length (EPL) corrections to correct one or more pseudorange measurements made by the GNSS receiver. In one embodiment, the trained model comprises a set of one or more neural networks, and the GNSS receiver is a GNSS pure L5 receiver does not use L1 GNSS signals to compute a position from GNSS signals, and wherein the GNSS pure L5 receiver does not receive and does not acquire L1 GNSS signals. In one embodiment of this GNSS receiver, the set of features comprises: (1) correlation vector features from a set of successive correlation vectors from correlators, in the GNSS receiver, for GNSS signals from a GNSS SV; (2) a mutual probability distribution function (pdf) data of the relative delay and relative amplitude from each of the correlators; (3)

other features relating to the GNSS receiver or GNSS SV. In one embodiment of this GNSS receiver, each of the one or more pseudoranges is corrected by subtracting a corresponding EPL correction from a measured pseudorange from a GNSS SV, and wherein the GNSS signals are wideband GNSS signals that have a chipping rate that exceeds a chipping rate for L1 GPS signals, and wherein the measured pseudorange is measured by, for example, a delay locked loop in the GNSS receiver (or by open loop pseudorange estimator) and wherein the one or more EPL corrections are derived based on outputs at the delay locked loop (DLL) which is a pseudorandom noise (PRN) tracking loop to track pseudoranges in the GNSS receiver. In one embodiment of this GNSS receiver, the other features comprise one or more of: (1) an elevation of a GNSS SV; (2) a signal to noise ratio (SNR) of a measured pseudorange; (3) a type of antenna used to receive the GNSS signals; (4) a tracking mode of the GNSS receiver; or (5) a tracking loop configuration of the GNSS receiver.

The aspects and embodiments described herein can include non-transitory machine readable media that can store executable computer program instructions that when executed cause one or more data processing systems (e.g., one or more GNSS processing systems in a GNSS receiver) to perform the methods described herein when the computer program instructions are executed. The instructions can be stored in non-transitory machine readable media such as in dynamic random access memory (DRAM) which is volatile memory or in nonvolatile memory, such as flash memory or other forms of memory. The aspects and embodiments described herein can also be in the form of data processing systems, such as GNSS receivers or portions of GNSS receivers, that are built or programmed to perform these methods. For example, a data processing system can be built with hardware logic to perform these methods or can be programmed with a computer program to perform these methods and such a data processing system can be considered a part of a GNSS processing system or part of a GNSS receiver. Further, the embodiments described herein can use one or more GNSS receiver architectures (or components, methods or portions of such architectures) described in U.S. patent application Ser. No. 17/068,659, filed Oct. 12, 2020 by Paul Conflitti, et. al., with oneNav, Inc. as the Applicant and this patent application is hereby incorporated herein by reference, and this patent application was published on May 5, 2022 under publication number US 2022/0137236.

The above summary does not include an exhaustive list of all embodiments and aspects in this disclosure. All receivers, systems, media, and methods can be practiced from all suitable combinations of the various aspects and embodiments summarized above and also those disclosed in the detailed description below.

BRIEF DESCRIPTION OF THE DRAWINGS

The present invention is illustrated by way of example and not limitation in the figures of the accompanying drawings in which like references indicate similar elements.

DETAILED DESCRIPTION

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" means that a particular feature, structure, or characteristic described in conjunction with the embodiment can be included in at least one embodiment. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

The methods and systems described in this disclosure can be used to mitigate multipath effects in GNSS receivers, which can improve the accuracy of position solutions provided by such GNSS receivers in various scenarios, including for example, urban canyons that often block many GNSS signals from GNSS SVs. These methods and systems can be used without requiring ray tracing algorithms or 3D building databases to create EPL corrections. Moreover, these methods and systems provide advantages over such algorithms as described further below because these methods and systems can correct pseudorange measurements in a GNSS receiver (e.g., by recognizing the shape of a burst of correlation vectors in a received GNSS signal) so that the corrected pseudorange measurement, from a delay locked loop in the GNSS receiver or other pseudorange measurement system in the GNSS receiver, can use the corrected pseudorange measurement in position solutions (e.g., within a position solution engine of the GNSS receiver). This disclosure will begin with a description of the training of a model according to one or more embodiments and the use of the trained model in a GNSS receiver, and then the disclosure will provide a description of the generation of training data and the extraction of EPL corrections from the generated training data.

Figure 1A:
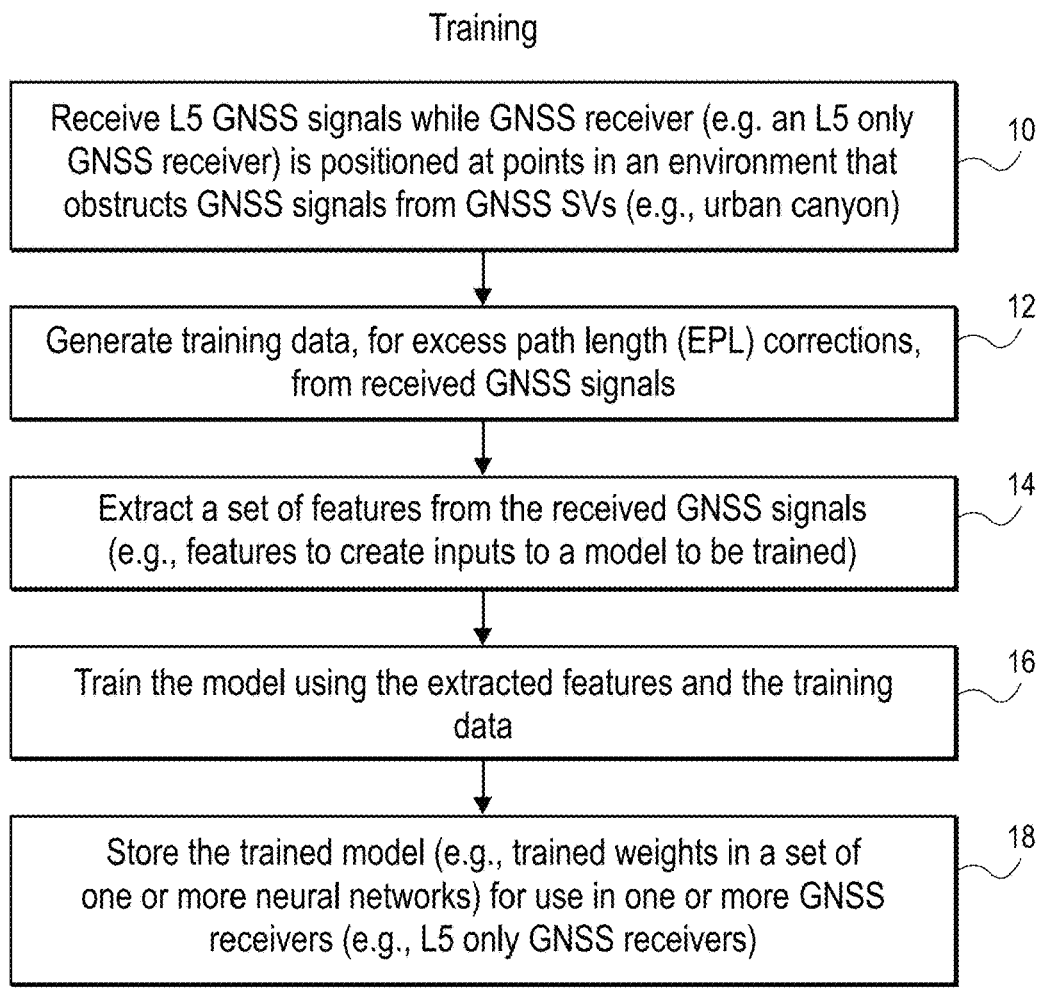
FIG. 1A is a flow chart that shows a method of training a model for use in a GNSS receiver according to one embodiment.
Figure 6A:
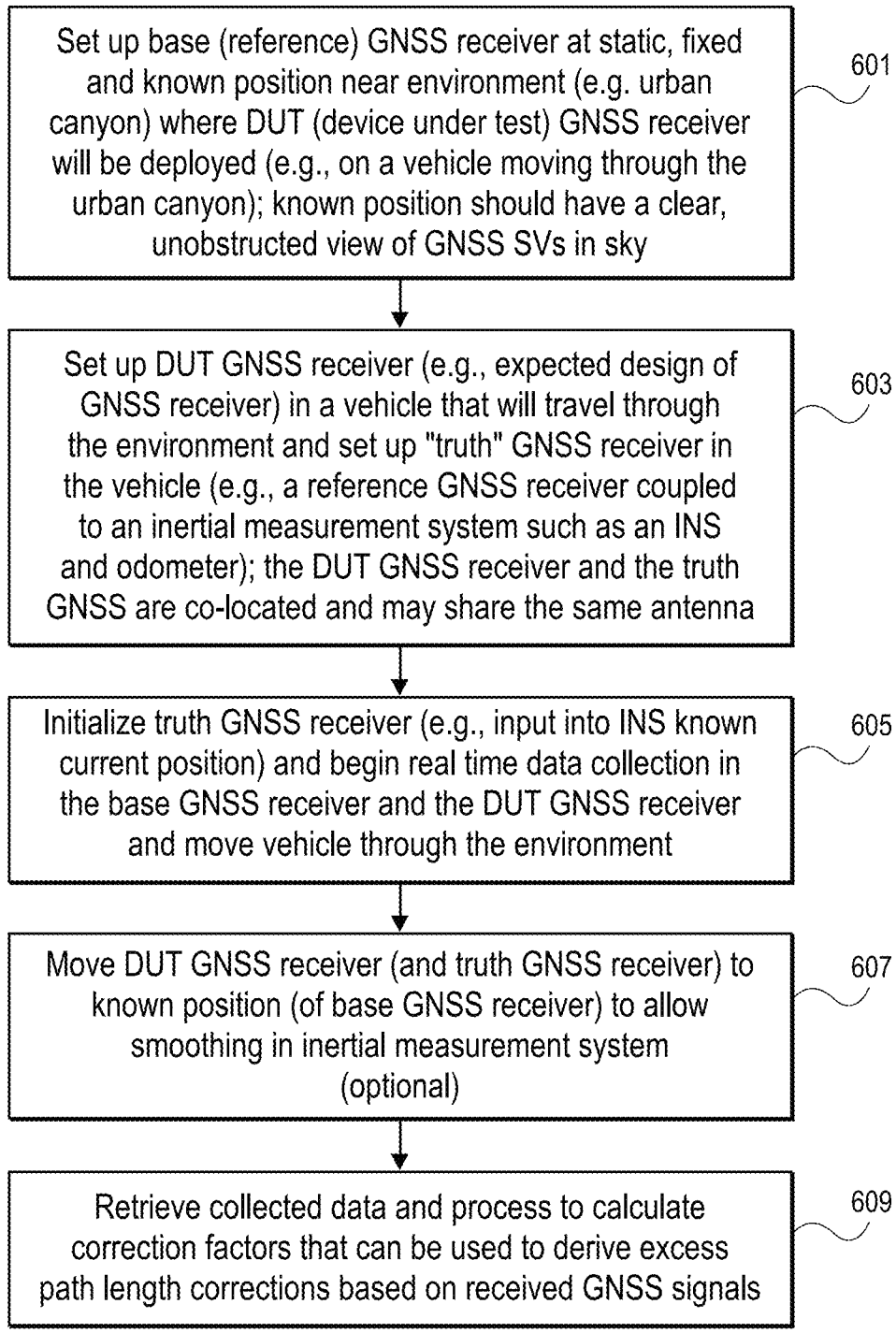
FIG. 6A is a flow chart that shows a method for generating the training data according to one embodiment.

FIG. 1A shows a general example of a method of training a model (e.g., a set of one or more neural networks); this method can be performed after the training data is generated as described further below (e.g., as shown in FIG. 6A). The method shown in FIG. 1A can use a set of data (e.g., data from a set of GNSS receivers such as a DUT receiver and a base receiver described further below) to generate training data. The same set of data, and the generated training data, can then be used to train the model. The model in one embodiment can be a hybrid neural network, such as the hybrid neural network (hybrid NN) shown in FIG. 2C. In operation 10, a GNSS receiver (e.g., a device under test (DUT) GNSS receiver) can receive GNSS signals (e.g., L5 GNSS signals) while the receiver is positioned (e.g., moved) at points in an environment that obstructs GNSS signals from GNSS SVs (such as an urban canyon). The GNSS receiver can be moved over time around the environment to generate a set of data that is used to generate enough data from which EPL corrections can be extracted. These EPL corrections are based on outputs from a delay locked loop (DLL) of the DUT receiver or from another type of pseudorange measurement system (e.g., an open loop pseudorange estimator) in the DUT receiver as described further below. The GNSS receiver (DUT receiver) can be positioned on a vehicle that is driven or otherwise moved through streets or other paths in the environment; for example, the vehicle can be driven through many streets in an urban canyon, such as the financial district of San Francisco or other major dense urban canyons or other environments with obstructed views of GNSS SVs. The received GNSS signals from operation 10 are processed in operation 12 to generate training data. This generation of training data is described further below (e.g., see FIG. 6A and associated description). This generation of training data can occur after the completion of the data gathering operations (e.g., after the vehicle has completed its traveling through the urban canyon and data representing the received GNSS signals and other outputs and other collected data (described below) has been stored for subsequent processing). In operation 14, a data processing system can extract a set of features from the received GNSS signals (e.g., the data stored from the data gathering operations that include operation 10); further details about the extraction of features is provided below. These extracted features are used an inputs to a model to be trained. The extracted features and the training data are used in operation 16 to train the model. The result of the training, in one embodiment, is a model file (containing trained weights and other data about the trained model) that can be stored, in operation 18, for use in GNSS receivers. In one embodiment, the stored model can be used only in GNSS receivers that are similar enough to the DUT receiver that was used to generate the training data; this similarity can be based upon one or more of: the architecture of the pseudorange measurement system used to measure pseudoranges (such as a delay locked loop in the DUT receiver or an open loop pseudorange estimation algorithm, etc.) and antenna of the DUT receiver (and other features of the DUT receiver) as further described below.

Figure 1B:
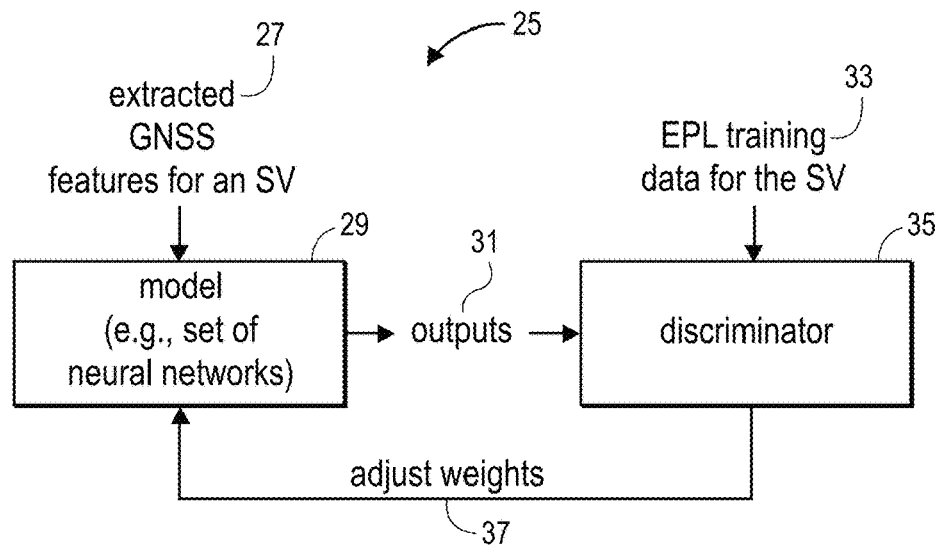
FIG. 1B shows an example of an embodiment that can be used to train a model.

FIG. 1B shows a simplified embodiment of system 25 for training a model, and the system 25 can use the method shown in FIG. 1A. The system 25 can include a model 29 that can be a set of one or more neural networks (e.g., the hybrid NN shown in FIG. 2C); the neural networks can be implemented in software with data and instructions that execute on one or more processors or can be implemented in a hardware system without software. The model 29 receives an extracted set of features 27 (e.g., the extracted set of features from operation 14 in FIG. 1A or the set of extracted features described below), and processes these features to derive outputs 31. The system 25 includes a discriminator 35 that is used to train the model during training by adjusting weights 37 in the one or more neural networks; during the training process, the discriminator receives outputs 31 and compares those outputs 31 to EPL training data 33 (from operation 12 that generates training data). Based on this comparison the discriminator can adjust one or more weights 37 used in the model to train the model. The discriminator will cause the training process to continue until a trained solution converges to a value that indicates that training can stop because the change in the successive comparisons has become small (e.g., less than a threshold value). The discriminator 35 will adjust the weights, through a back propagation process within the model, in order to reduce this change in successive comparisons, and once the change falls below the threshold value, the training process can stop.

Figure 2A:
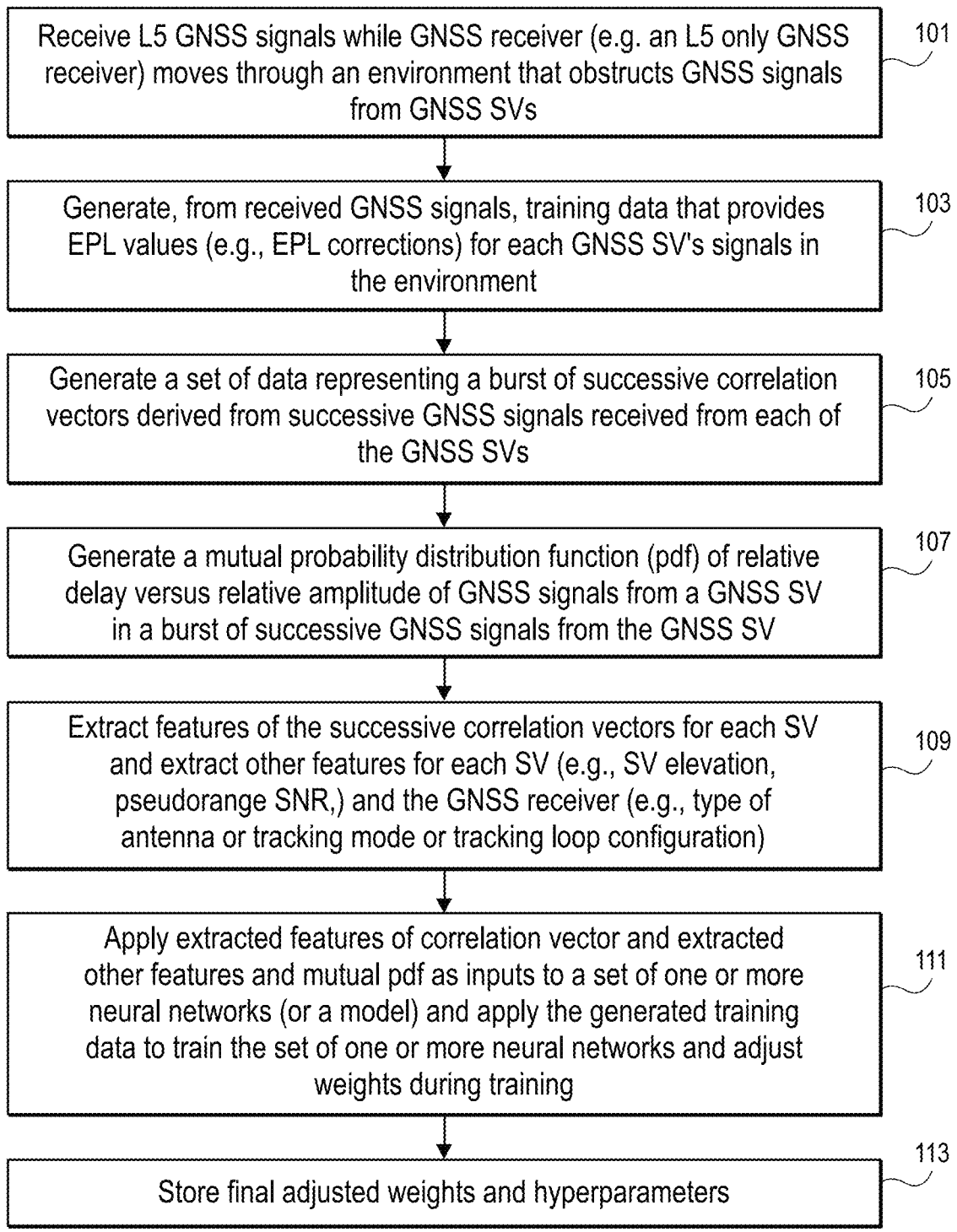
FIG. 2A is a flow chart that shows another embodiment of a method of training a model for use in a GNSS receiver to correct measured pseudoranges in the GNSS receiver.

FIG. 2A shows a more detailed example of a method for training a model according to an embodiment. This method can begin in operation 101; in operation 101, a DUT GNSS receiver (and a base GNSS reference receiver as described below) receive the same set of GNSS signals at the same time; in one embodiment that is described further below (e.g., see FIG. 6A and associated description), the base GNSS reference receiver (e.g., base GNSS reference receiver 503 in FIG. 5A) is at a stationary location that has a known location and has an unobstructed view of the GNSS SVs above the horizon near an environment that obstructs GNSS signals from the same set of GNSS SVs. While the base GNSS reference receiver receives and processes GNSS signals to measure and store pseudoranges, at associated GNSS times with known ranges to GNSS SVs in view, the DUT receiver is moved around the environment, which can be an urban canyon near the known location of the base GNSS reference receiver. For example, the DUT receiver (e.g., DUT receiver 557 shown in FIG. 5B) can be moved on a vehicle through many streets of the urban canyon while it receives and processes GNSS signals to measure and store pseudoranges at the associated GNSS times. A third GNSS receiver (e.g., reference GNSS receiver 559 coupled to an inertial navigation system 561 as shown in FIG. 5B) can also be on the vehicle to provide a precise location of the DUT receiver at each of the associated GNSS times. These precise locations and associated times from the reference receiver on the vehicle can be used with ephemeris data for each corresponding GNSS SV to determine the true range to each SV and the true (precise) location of the DUT receiver at the time that a pseudorange measurement was made in the DUT receiver on the vehicle. Data collected from these received GNSS signals can be stored and used in the rest of the method shown in FIG. 2A.

In operation 103 of FIG. 2A, training data is generated from the received GNSS signals. This training data provides excess path length (EPL) corrections that are derived from outputs of a pseudorange measurement system, such as a DLL in the DUT receiver, where the DLL is part of the pseudorange tracking loop in the DUT receiver, and these outputs provide measured pseudoranges for each GNSS signal that is received. The generation, in operation 103, of this training data is described further below (e.g., see FIGS. 5A-6C and associated description below). The generated training data is used in operation 111 in FIG. 2A to train the model.

In operation 105 of FIG. 2A, a data processing system generates a set of data representing a burst, over a short period of time such as 0.01 seconds or 0.05 seconds, or even longer), of successive correlation vectors that are determined from successive GNSS signals, and this generation of bursts is repeated over the set of GNSS data that was collected. The burst 133 shown is FIG. 2C shows an example of such bursts. In one embodiment, a bank of correlators can generate, for a received GNSS signal, a correlation vector ("CorrVec") that represents the outputs from the bank of correlators. In one embodiment in which there are 21 correlators in the bank of correlators in the DUT receiver, each correlation vector can be a 21 by 1 vector. In one embodiment, the burst can be a grouping of 10 successive correlation vectors from channel A (e.g., channel E5a signals from a GNSS SV in the Galileo constellation) and another burst can be a grouping of 10 successive correlation vectors from channel B (e.g., channel E5b signals from the same GNSS SV in the Galileo constellation). Operation 105 produces many such bursts using the stored data that was collected during the movement of the DUT receiver through the urban canyon (and the movement can last for many minutes resulting in many bursts being generated from the collected and stored data). These bursts are used to create inputs to the model during training of the model as described further below.

In operation 107, a burst from the set of generated bursts (from operation 105) is used to generate a mutual probability distribution function (pdf) that is mapped over relative delay versus relative amplitude; the plot 151 shows an example of such a pdf over relative delay 161 (derived from a burst of correlation vectors) and relative amplitude 163 (also from the same burst of correlation vectors). Each burst can be used to generate a mutual pdf that can be used as an input to train the model. In an alternative embodiment, each burst of correlation vectors can be represented as a 2D plane of data where each plane has 21 by 10 elements for a burst of 10 correlation vectors. In an alternative embodiment, a covariance matrix can be used instead of the mutual pdf; in one embodiment, the covariance matrix can be an N by N matrix that defines the correlation between each element of the N taps within a correlation vector, where N=21 in the example of a 21 by 1 correlation vector. Techniques are known in the art to compute these covariance matrices from the correlation vectors.

In operation 109, the data processing system that is creating the model extracts features of the successive correlation vectors for each GNSS SV in the set of received GNSS signals (to create extracted features 136 shown in FIG. 2C) and also extracts other features (e.g., other features 131 in FIG. 2C), and these extracted features are then used as inputs to train the model. In one embodiment, one or more of the following features are extracted from each of the correlation vectors: the relative amplitude of local maximum points in the correlation vector; the relative delay of the correlation peaks in the correlation vector; the width of the strongest peak in the correlation vector; and the number of strong peaks (which exceed a threshold that defines a strong peak) in the correlation vector. The other extracted features (e.g., other features 131 in FIG. 2C) in one embodiment can include one or more of the following features: the elevation of the SV (at the time of the generation of the correlation vector); the signal to noise ratio of the pseudorange signal (e.g., the SNR of the signal from which the pseudorange was measured); the type of antenna of the DUT receiver (e.g., linear polarized antenna or circular polarized antenna; or dipole antenna or patch antenna); the tracking mode of the receiver (e.g., DUT receiver) such as whether the receiver is using a narrow mode tracking or a wide more tracking; and the tracking loop configuration of the GNSS receiver (e.g., closed loop or open loop with no feedback from prior operations of the tracking loop). In one embodiment, the training process involve training with different types of DUT receivers each of which may use a type of DUT receiver (e.g., a DUT receiver with an open loop for tracking, a DUT receiver with a closed loop for tracking, a DUT receiver with a linear antenna, a DUT receiver with a circular polarized antenna, etc.). These features (e.g., the features from the extracted correlation vectors and the other extracted features) are then applied in operation 111 to the model (e.g., the set of neural networks shown in FIG. 2C) to train the model. In one embodiment, the data from the extracted features (from the correlation vectors) and the extracted other features are preprocessed using a method such as the method shown in FIG. 4 to prepare the inputs to the model for the training process in operation 111.

Figure 4:
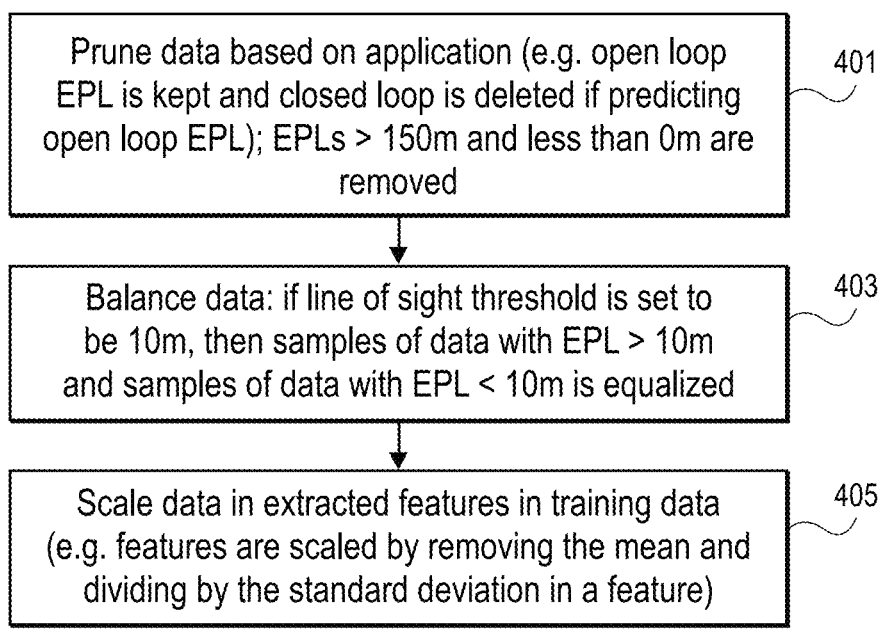
FIG. 4 is a flow chart that shows a method of preparing data to be processed by a model (in both training of the model and use, at inference time, of the model).

FIG. 4 shows an example of a method for preprocessing the extracted data before applying the data as inputs to a model to be trained (and also applying extracted data at inference time to a trained model). In operation 401, the data, such as the extracted features from the correlation vectors (e.g., extracted features 136 in FIG. 2C) and the extracted other features (e.g., other features 131 in FIG. 2C), is pruned; this can involve removing some data that is not applicable to the particular training so that the removed data is not applied to the model during the training process. For example, if the model being trained is for use in a receiver that will use an open loop pseudorange measurement system to estimate pseudoranges (and a closed tracking loop will not be used), then the data obtained from a closed tracking loop DUT receiver will be deleted from the set of input data used to train a model. Also in one embodiment, training data that includes EPL corrections of greater than a selected value (e.g., greater than 150 meters) or less than another selected value (e.g., less than 0 meters) can also be deleted from the set of input data used to train the model. The preprocessing can also include balancing data, such as the balancing in operation 403. For example, in one embodiment, the amount of data above a selected value and the amount of data below the selected value is equalized or substantially equalized (e.g., within 10% of each other). In one embodiment, if the line of sight threshold is set at 10 meters and there are mores sample of data with EPL exceeding 10 meters than samples of data with EPL less than 10 meter, then samples of data with EPL greater than 10 m are reduced to balance out the number of sample on both sides if the threshold. The preprocessing can also include scaling data in the extracted features in operation 405. In one embodiment, the scaling can be achieved by removing the data (within each group) that is the mean (e.g., the mean amplitude for the extracted features from the correlation vectors) and dividing each value within the group by the standard deviation with a particular extracted feature. It will be appreciated that other types of preprocessing can be used to create a final set of input data to be applied during training the model.

After the preprocessing of the input data, the extracted features from the correlation vectors and the extracted other features and the generated mutual pdfs and the generated training data are applied to the model to train the model. In one embodiment, the same set of collected GNSS data (e.g., collected as shown in the method of FIG. 6A) is used to create the correlation vectors and the extracted features (e.g., the extracted features from the correlation vectors and the extracted other features and the generated mutual pdfs) and the generated training data so that the model is trained with the same set of GNSS collected data; this ensures that the EPL corrections in the generated training data correspond to the inputs used to create the generated training data. The training process can use a discriminator to compare outputs from the model during training to the generated training data (e.g., the generated EPL corrections from the method shown in FIG. 6A), and the discriminator can adjust, through back propagation, the weights in the model, based on each comparison, to achieve a converged solution. Thus, the training process can use the architecture shown in FIG. 1B to train the model. The training process can be performed over multiple training epochs until there is a convergence in the solution as described above. Once there is a convergence (e.g., based on a comparison of successive comparisons between the outputs from the model and the generated training data), the training system can store, in operation 113, the information about the model in a model file which can include data about the adjusted weights and hyperparameters.

Figure 2B:
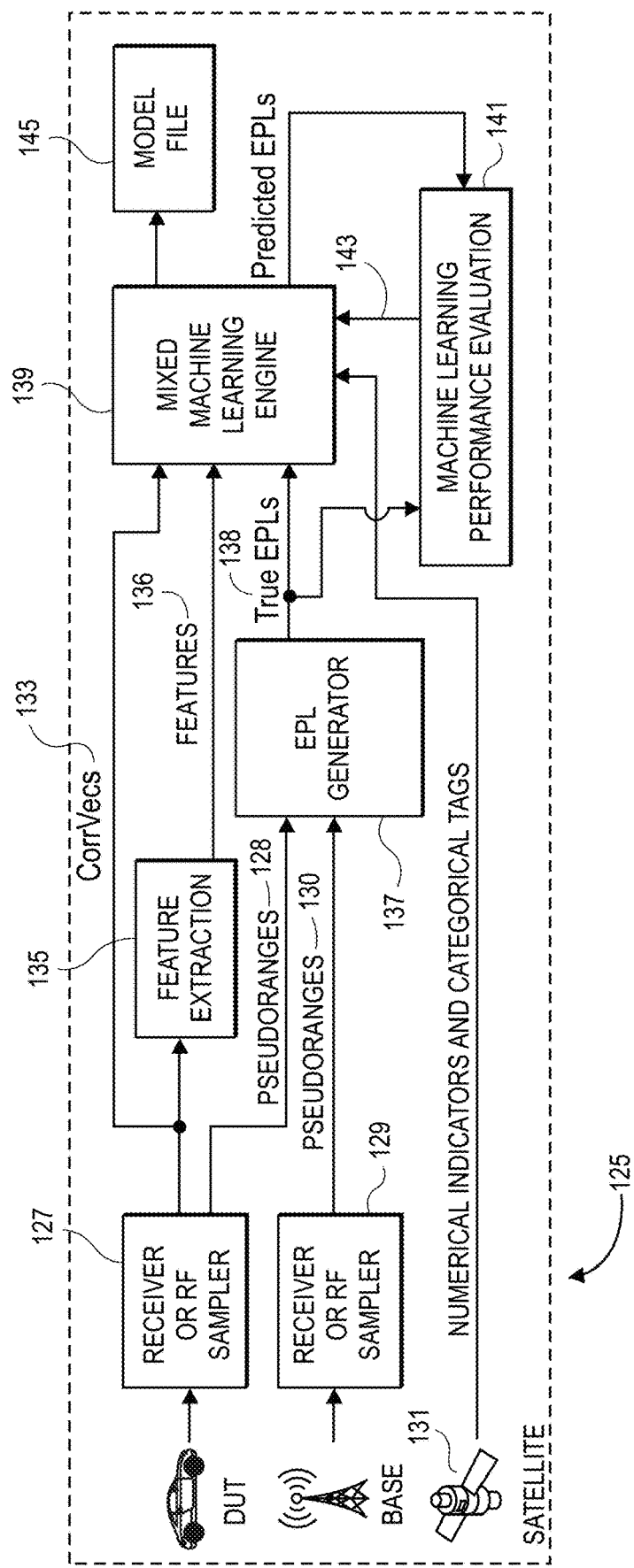
FIG. 2B shows an example of a system to train a model according to one embodiment.
Figure 2C:
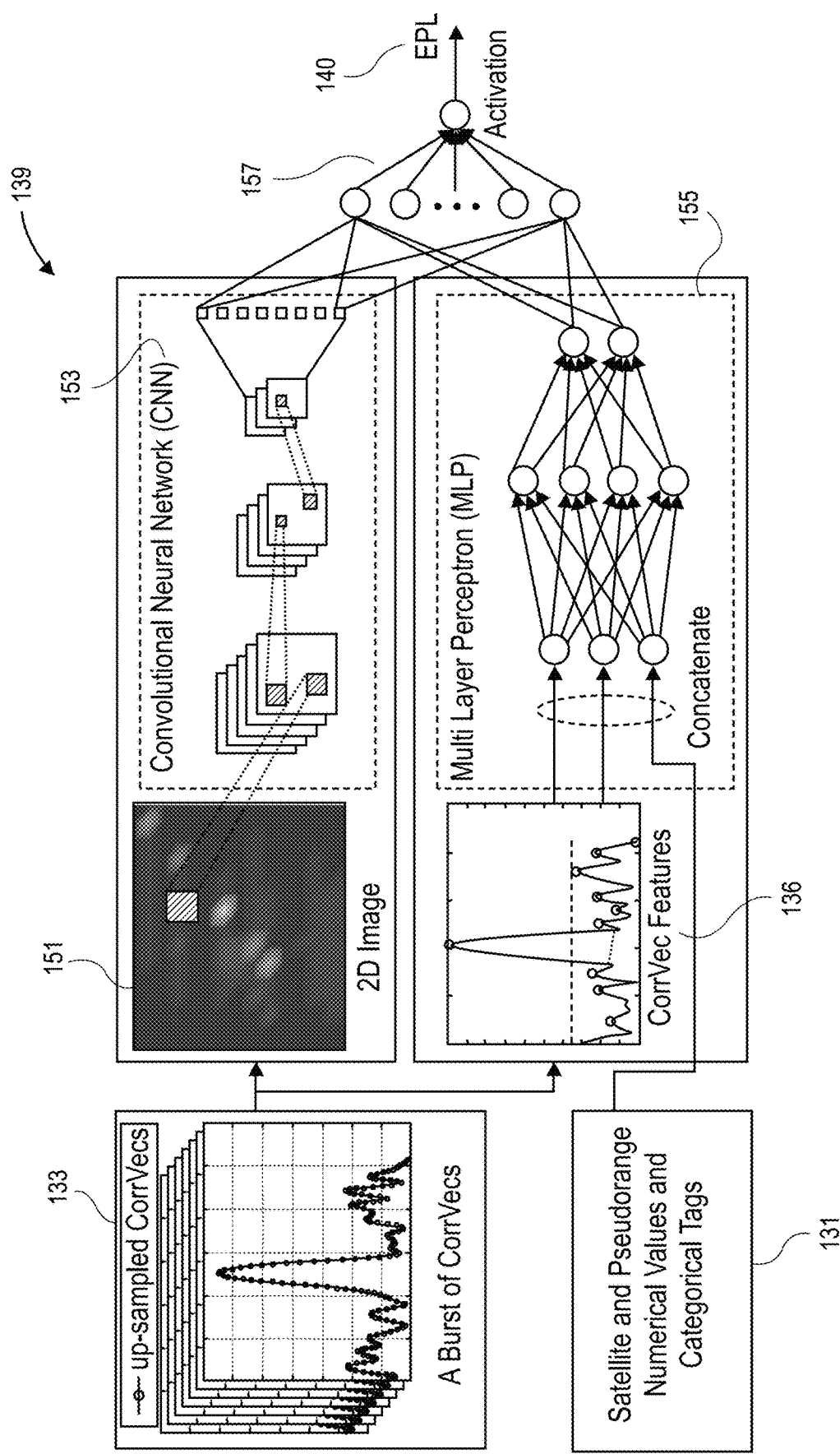
FIG. 2C shows an example of an embodiment of a set of neural networks that can be used a model.
Figure 2D:
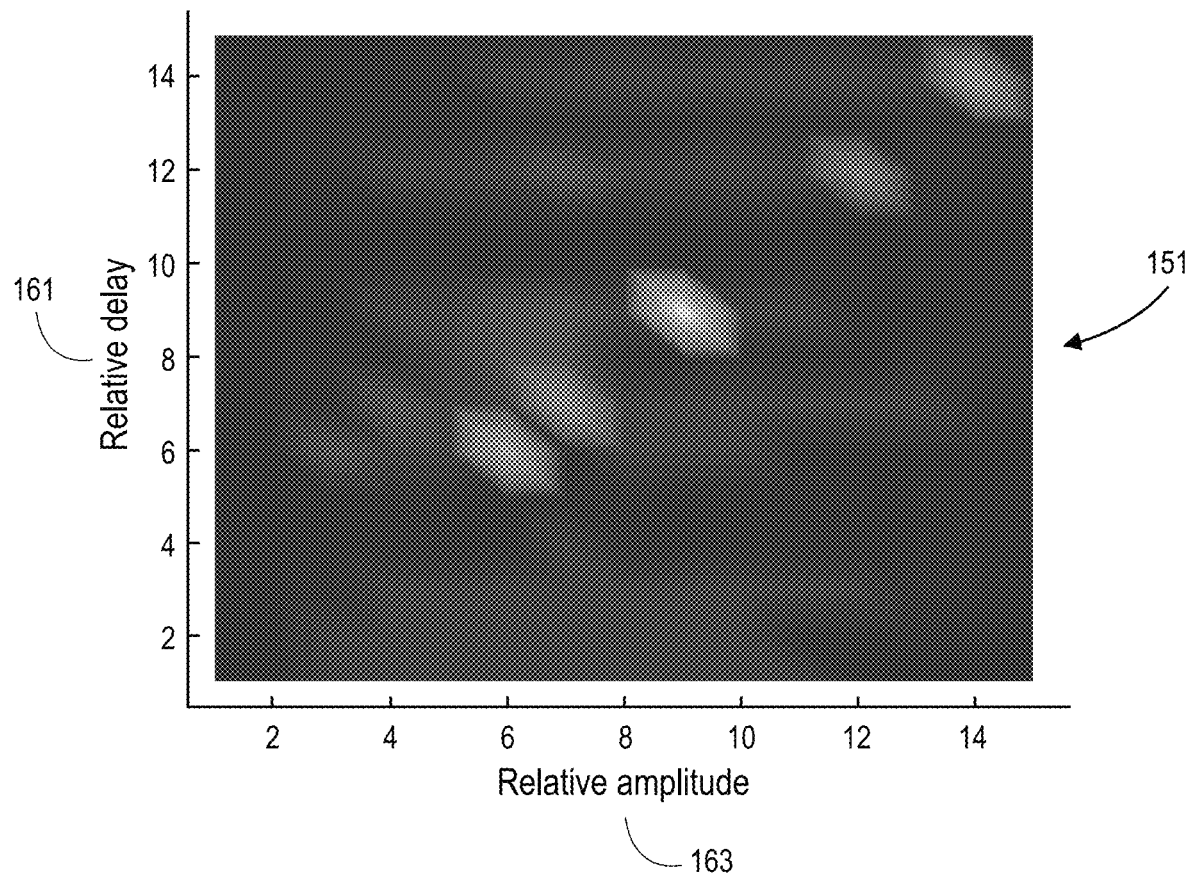
FIG. 2D shows an example of a mutual probability distribution function (pdf) that can be used in one or more embodiments.

FIG. 2B shows an example of a system 125 to train a model for use in correcting pseudorange measurements in a GNSS receiver. In this example, the system 125 uses a DUT receiver 127 (which can be the same as the DUT receiver 557 in FIG. 5B) to receive and process GNSS signals to provide measure pseudoranges (derived through the DLL in the pseudorange tracking loop of the DUT receiver or derived through another pseudorange estimation system) as part of the collected data and also uses a base reference receiver 129 (such as the base reference receiver 503 in FIG. 5A) to receive and process GNSS signals as part of the collected data which will be used to correct common errors between the two (base and DUT) GNSS receivers as explained below. The system also extracts data used for the other features 131 (e.g., SV elevation data, type of antenna used to receive GNSS signals on the DUT receiver, etc.). The data outputs from the DUT receiver 127 include the correlation vectors 133. The feature extractor 135 extracts the features from the correlation vectors and also generates the mutual pdf; thus, the feature extractor 135 can perform operations 107 and 109 in FIG. 2A to generate the features 136 (which can include the mutual pdf, the extracted other features and the extracted features based on the correlation vectors). The measured pseudoranges 128 and 130 from the DUT receiver and the base receiver (respectively) are applied to the EPL generator 137 which generates the EPL correction training data 138 (e.g., using the method shown in FIG. 6A). The model 139 is trained using the features 136 and the generated EPL correction training data 138. As described herein, the model can be trained over multiple training epochs, and each epoch can involve a change to the weights that are back propagated through the model as is known in the art. The discriminator 141 compares the output 140 from the model in each training epoch to the true EPLs 138, and adjusts (through feedback 143) the weights based on the comparison until a converged solution is achieved as explained above. When the converged solution is achieved, the model file 145 is created and stored.

In one embodiment, the model 139 can be a hybrid neural network (hybrid NN), such as the hybrid neural network shown in FIG. 2C. This hybrid neural network can also be used as model 29 in FIG. 1B. This hybrid NN can include a set of neural networks such as a convolutional neural network (CNN) 153, a CNN 155, and a neural network 157 that are coupled together as shown in FIG. 2C. The CNN 153 receives a mutual pdf, such as plot 151, and analyzes the mutual pdf to provide a set of outputs to the neural network 157. The CNN 155 receives the extracted correlation vector features (e.g., relative amplitude of local maximum points in a correlation vector or burst of correlation vectors, relative delay of the correlation peaks in a correlation vector or burst of correlation vectors, etc.), and the CNN 155 also receives the extracted other features (e.g., other features 131) and analyzes the extracted correlation vector features to provide a set of outputs to the neural network 157. The NN 157 generates an output 140 that is the EPL for the current set of inputs (131, 133, 151, and 136). This EPL is based on the outputs from the receiver's pseudorange measurement system that is used to track pseudoranges (e.g., the DLL of the DUT receiver or [in the case of a GNSS receiver with a trained model] the DLL of the GNSS receiver that uses the trained model). Hence this EPL is different than the ray tracing approach of calculating EPL as explained further below in conjunction with FIGS. 3C and 7, although the two approaches may in certain scenarios provide similar EPL values.

In one embodiment the CNN 153, the CNN155, and the NN 157 can be implemented in the following manner which is provided as an example. In this example, a machine learning platform known as TensorFlow is used with Keras which is a deep learning API (application program interface) written in Python, and the API interfaces with TensorFlow. The Keras API can be used in this example to connect the three NNs using the following configurations:
combinedInput=concatenate([model_NN.output, model_CNN2.output, model_CNN.output])
x=Dense(4, activation="relu")(combinedinput)
x=Dense(1, activation="linear")(x)
model=Model(inputs=[model_NN.input, model_CNN2.input, model_CNN.input], outputs=x)

Further, in this example, the CNN 153 and the CNN 155 can each be constructed using the following configuration:

```
def create_cnn(dim, filters=(16, 32, 64), regress=False):
    inputShape = dim
    chanDim = -1
    inputs = Input(shape=inputShape)
    for (i, f) in enumerate(filters):
```

```
    if i == 0:
        x = inputs
    x = Conv2D(f, (3, 3), padding="same")(x)
    x = Activation("relu")(x)
    x = BatchNormalization(axis=chanDim)(x)
    x = MaxPooling2D(pool_size=(2, 2))(x)
x = Flatten( )(x)
x = Dense(128)(x)
x = Activation("relu")(x)
x = BatchNormalization(axis=chanDim)(x)
x = Dropout(0.5)(x)
x = Dense(4)(x)
x = Activation("relu")(x)
if regress:
    x = Dense(1, activation="linear")(x)
model = Model(inputs, x)
model.summary( )
return model
```

In this example, the NN 157 can be constructed using the following configuration:

```
def create_mlp(dim, regress=False):
    model = Sequential( )
    model.add(Dense(64, input_dim=dim, activation="relu"))
    model.add(Dense(32, activation="relu"))
    model.add(Dense(4, activation="relu"))
    if regress:
        model.add(Dense(1, activation="linear"))
    model.summary( )
    return model
```

In this example, the following hyperparameters can be used to train the model:
opt=Adam(1r=1e-3, decay=1e-3/200)
model.compile(loss="mse", optimizer=opt)
history=model.fit(x=[Z_train,M_train, X_train], y=y_train, validation_data=([Z_test,M_test, X_test], y_test),epochs=100, batch_size=64) #v 1.0

This example can be used to create the hybrid NN that can be the model 139 or the model 29 described and shown herein. Once the model is trained, it can be the trained model 315 in FIG. 3A and provide the model file 343 that is used by engine 341 in FIG. 3B.

The training of the model can employ techniques to ensure that a wide variety of urban canyons and other types of signal obstructions are encountered by the DUT receiver during data collection prior to generating the EPL correction data. This will tend to improve the trained model's ability to provide accurate EPLs in a variety of different situations or physical environments (such as physical environments not encountered during data collection using the method in FIG. 6A). There is no requirement that the trained model in a GNSS receiver have been trained in the urban canyon that currently surrounds the GNSS receiver; in other words, the trained model will work in any particular environment even if the DUT receiver was not trained in that particular environment. Moreover, different types of receiver architectures may be separately trained given that the EPL generation (e.g., the method shown is FIG. 6A) is dependent upon the particular receiver architecture (e.g., the DUT's DLL, type of antenna, etc.). Thus, one model is trained for a first DLL architecture and antenna type, and another model is trained for another DLL architecture and antenna type, and the different models are deployed to the matching architecture of the target GNSS receiver.

Figure 3A:
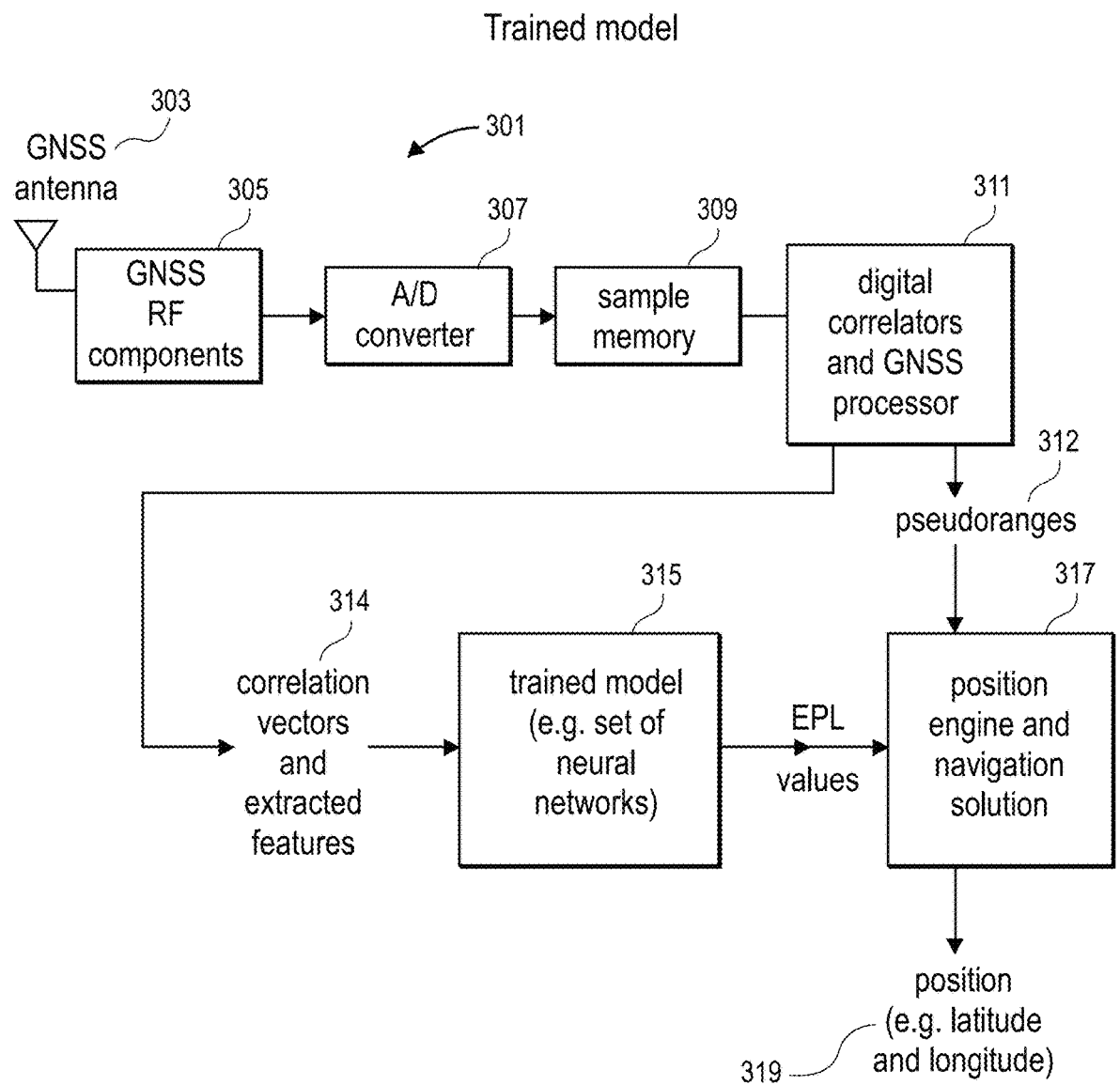
FIG. 3A shows an example of a trained model according to one embodiment.
Figure 3B:
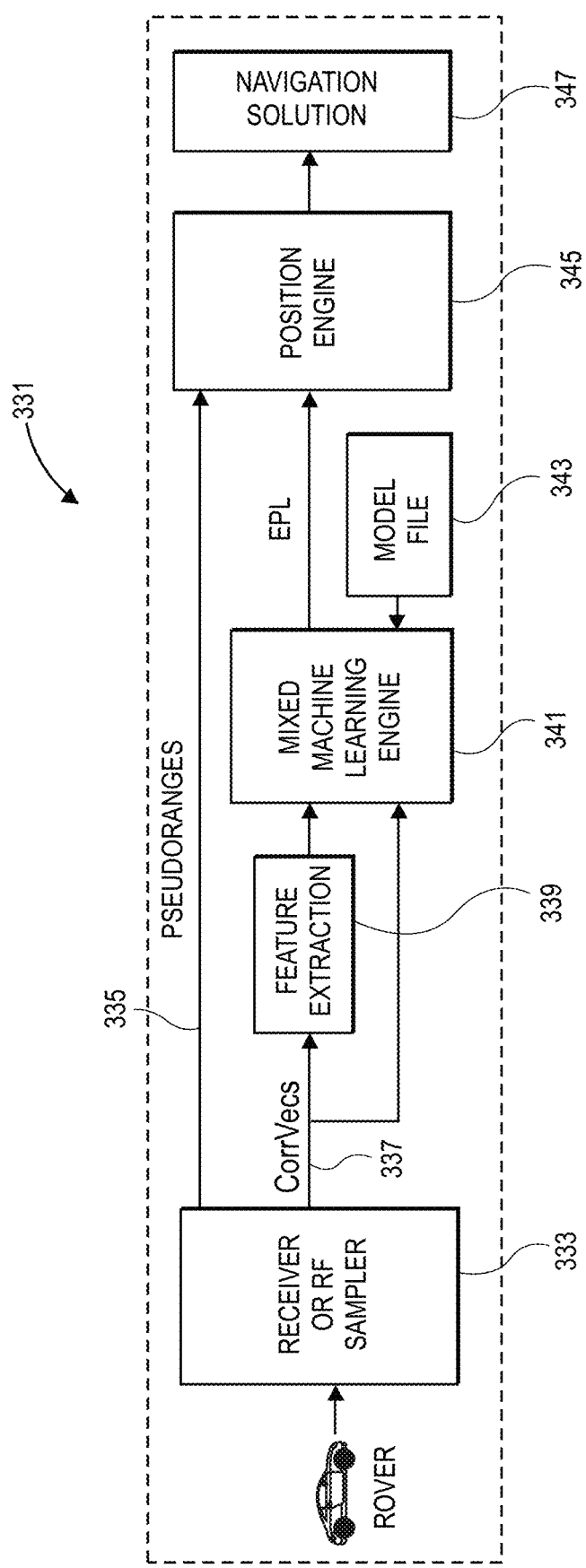
FIG. 3B shows another example of a trained model according to an embodiment.

Once a trained model has been created, it can be used in a GNSS receiver to correct pseudorange measurements made through the GNSS receiver's pseudorange measurement system, such as the GNSS receiver's DLL (which should be the same as the DLL in the DUT receiver that was used to train the model). FIGS. 3A and 3B show examples of embodiments of GNSS receivers that contain such trained models. The GNSS receiver 301 in FIG. 3A includes a GNSS antenna 303 (e.g., a linear polarized antenna) that provides received GNSS signals to RF (radio frequency) circuitry in GNSS RF components 305; these RF components can filter and amplify the received GNSS signals as in known in the art. The amplified GNSS signals are then digitized in the analog-to-digital (A/D) converter 307, and the digitzed GNSS signals are stored in sample memory 309 for processing by the digital correlators and GNSS processor 311. The digital correlators include a DLL that tracks pseudoranges for each of the received channels of the GNSS signals; this DLL can be a conventional DLL that is known in the art. The DLL produces measured pseudoranges 312 to the position engine 317 which computes a navigation solution based on the measured pseudoranges (as corrected by the EPL corrections from the trained model 315). In this example in FIG. 3A, the GNSS receiver uses a DLL for a pseudorange measurement system. As is known in the art, a pseudorange measurement system in a GNSS receiver can have one or both of a closed loop system, such as a DLL, and an open loop system such as an open loop estimation algorithm. When both are present in a GNSS receiver, they can be used at different times depending on the state of PRN acquisition in the GNSS receiver. Open loop measurement quality is usually less accurate than a closed tracking loop, but open loop measurements are usually faster, so open loop measurement is typically used for fast (re)acquisition of the PRN code phase and initial internal PRN code phase injection into the closed loop, then the mode is switched from open loop to a closed loop when the closed loop has converged. An open loop measurement algorithm is also continually used when the SNR is too low for a tracking loop to function properly. The position engine 317 can be conventional position engine that generates a navigation solution such as a position 319 in latitude, longitude and altitude, although the position engine will use the EPL value for the current measured pseudorange to correct the pseudorange before using the pseudorange in the engine. The DLL (or other pseudorange measurement system) will provide measured pseudoranges for each GNSS signal being estimated by the pseudorange measurement system as is known in the art, and the trained model 315 can provide EPL correction values based upon the inputs 314 to the trained model 315. Each of these inputs 314 over time will be based upon the current GNSS signal that produces the current measured pseudorange for the GNSS signal. In one embodiment, the inputs 314 can include a mutual pdf (e.g., plot 151), the extracted other features (e.g., other features 131), the correlation vectors (e.g., a burst of correlation vectors 133) and the extracted features based on the correlation vectors (e.g., relative amplitude of local maximum points in the correlation vectors, the relative delay of the peaks in the correlation vector, the width of the strongest peak in the correlation vector, and the number of strong peaks in the correlation vector). The GNSS processor 311 can perform operations 105, 107, and 109 (in FIG. 2A) to create these inputs 314 for a given digitized GNSS signal, and the GNSS processor 311 can also perform the method of FIG. 4 to preprocess the data to generate inputs 314. Generally, the inputs to the model 315 will be processed during inference time (when the trained model is used) in the same way that the inputs were processed during training of the model. The model 315 can be the same architecture as the model 139 (and hence it includes the CNN 153, the CNN 155 and the NN 157).

FIG. 3B shows another example of a trained GNSS receiver 331 which includes a trained model file 343. RF sampler 333 processes digitized GNSS signals in a DLL to provide measured pseudoranges 335 and also correlation vectors 337. The feature extractor 339 extracts features from the correlation vectors (e.g., the feature extractor generates a mutual pdf and extracts features from the correlation vectors and other features). The extracted features and the correlation vectors are provided to the engine 341 which is configured by the trained model file 343 to provide a trained model implemented by the engine 341. The engine 341 computes the current EPL correction values based on the current inputs, and these current EPL correction values are provided as inputs to the position engine 345 which also receives the measured pseudoranges 335. The position engine 345 uses the current EPL correction values (derived from the current measured pseudoranges) to correct the current measured pseudoranges, and the corrected pseudoranges are then used in conventional position solution calculations in the engine 345 to compute a navigation solution 347.

Figure 3C:
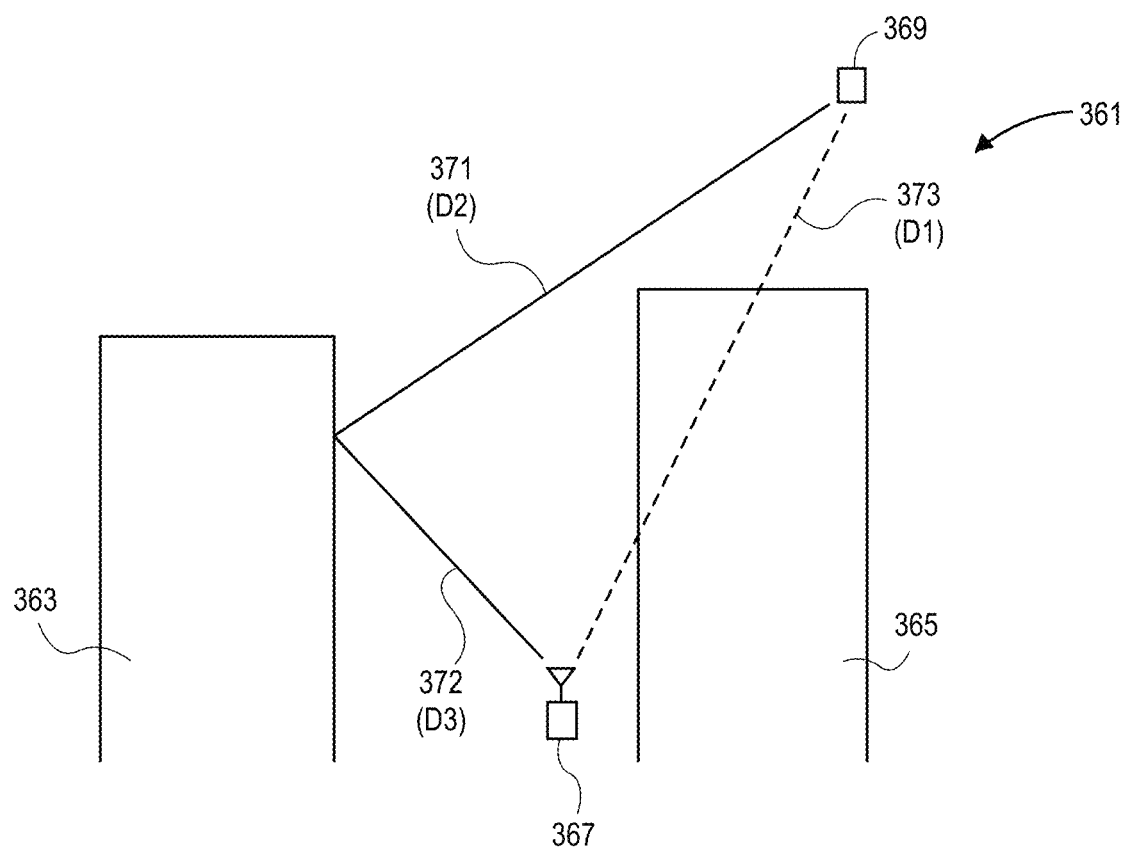
FIG. 3C shows an example of a multipath scenario in an urban canyon (with the LOS signal blocked by a building).
Figure 7:
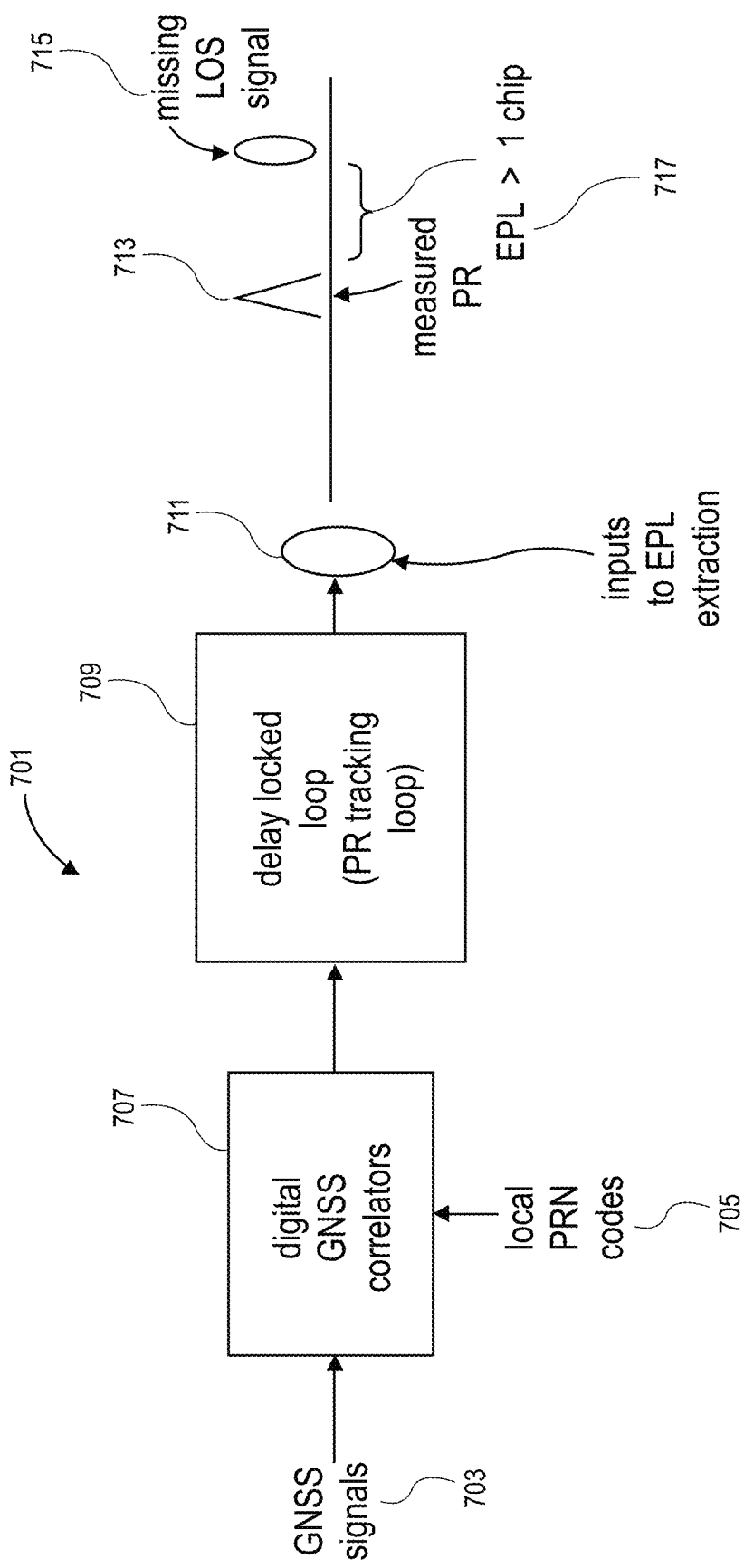
FIG. 7 shows an example of one or more embodiments that use the architecture of a GNSS receiver (both the DUT receiver used to generate EPL corrections and a GNSS receiver that contains a trained model after training of a model to obtain the model) to generate the EPL corrections.

An EPL correction in the disclosed embodiments corrects a measured pseudorange by adjusting the measured pseudorange to what may be considered a virtual pseudorange without multipath (and this virtual pseudorange can be considered a true pseudorange that can be measured at the GNSS receiver in an LOS situation without distortion from multipath at the output of the receiver's pseudorange measurement system such as a DLL). This EPL correction, achieved through outputs of the pseudorange measurement system of the receiver, is different than the classic EPL correction achieved through ray tracing algorithms. FIGS. 3C and 7 will be used to illustrate this difference.

FIG. 3C shows an urban canyon 361 created, at least in part, by buildings 363 and 365 that surround a street or other path being traversed by the mobile GNSS receiver 367. The buildings 363 and 365 block GNSS signals from multiple GNSS SVs, including the GNSS SV 369. GNSS signals from the GNSS SV 369 can reach the GNSS receiver 367 through one or more NLOS paths such as the path that includes a NLOS signal 371 (path D2) and the reflection 372 (path D3) off the building 363. A virtual LOS signal (path D1) is the path 373 that is blocked by the building 365. A classic ray tracing algorithm derives an EPL correction by computing the difference between (D2+D3) and D1 (i.e., the EPL correction is calculated from the ray tracing algorithm as: EPL=(D2+D3)−D1), and this EPL correction can be subtracted from the measured pseudorange in the GNSS receiver. The outputs from the receiver's pseudorange measurement system (e.g., the receiver's DLL) in this classic ray tracing approach are not used to compute the EPL correction. This classic ray tracing approach is independent of the receiver's architecture and the EPL correction is always positive. In contrast, the embodiments described in this disclosure derive the EPL corrections from outputs of the receiver's pseudorange measurement system (and the corrections were trained from the outputs of the pseudorange measurement system in a DUT receiver which should preferably match the pseudorange measurement system of the GNSS receiver at inference time). This distinction is shown in FIG. 7 which shows the correlators and DLL of a GNSS receiver according to one or more embodiments described herein.

For example, the system 701 in FIG. 7 can be part of the GNSS receiver 301 in FIG. 3A or a DUT GNSS receiver 557 in FIG. 5B. The system 701 includes a set of digital GNSS correlators 707 that cross correlate the received GNSS signals 703 with locally generated PRN (pseudorandom noise) codes 705; these correlators are known in the art. The correlation outputs from the correlators are applied as inputs to one or more DLLs such as the delay locked loop 709 which is part of the tracking loop for tracking pseudoranges of acquired GNSS signals in this example. The digital correlators 707 can be implemented in hardware correlators or as a processing system that uses fast Fourier transforms to perform the cross correlations. The outputs from the DLL 709 provide the measured pseudorange 711 for each tracked GNSS signal, and it is these outputs that are applied as inputs to the trained model to generate EPL corrections. The result is a correction that is based on the architecture of the actual GNSS receiver containing the trained model, so the EPL correction (e.g., EPL correction 717) can be greater than 1 chip and can be before or after the measured delay/pseudorange 713, and the EPL correction represents what may be the missing LOS signal 715 (if it is missing). It is possible that, due to the architecture of the DLL (or other pseudorange measurement system), the correction is negative (and not always positive as in the case of EPL corrections based on ray tracing). The EPL corrections achieved through the DLL (or other pseudorange measurement system) of the receiver (in the disclosed embodiments) faithfully represent the behavior of the particular GNSS antenna and receiver architecture (in the trained model if the DUT receiver used in training had the same architecture), and these EPL corrections include the tracking error of the receiver's pseudorange measurement system, whatever it may be. This approach better models and corrects for a given architecture (relative to the ray tracing approach). Using a training receiver (the DUT receiver) with the same architecture as the GNSS receiver with the trained model to generate the training data (e.g., using the method in FIG. 6A) provides a high fidelity way of match the training data to the GNSS receiver that will be deployed. If the target GNSS receiver is changed, then training should be performed again using a DUT receiver that has the changed architecture of the target GNSS receiver that will be deployed for use.

Figure 5A:
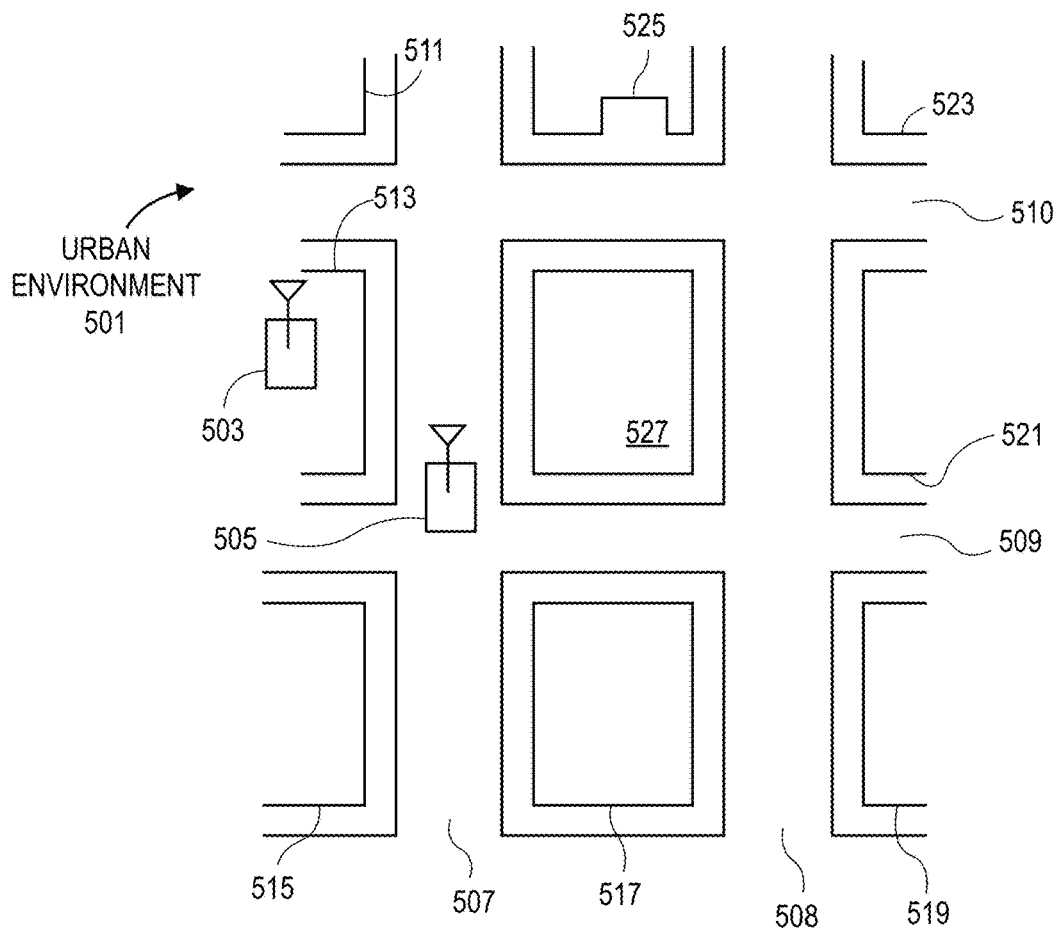
FIG. 5A shows a bird's eye view of an urban canyon that surrounds a device under test (DUT) receiver in a process for generating training data (to be used to train a model).
Figure 5B:
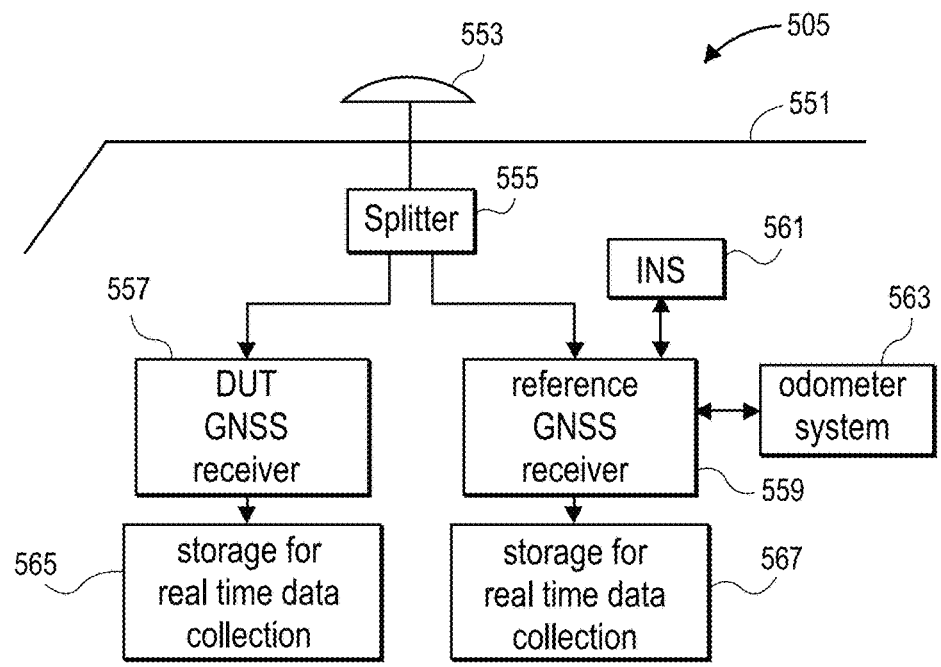
FIG. 5B shows an example of a vehicle that includes the DUT receiver and a reference receiver for use in a process for generating the training data.

The disclosure will now provide a description of the generation of training data and the extraction of EPL corrections from the generated training data by referring to FIGS. 5A, 5B, 6A, 6B, 6C and 8. The training data can be generated by using at least two GNSS receivers (a DUT receiver and a base receiver) and at least one vehicle to hold the DUT receiver (or two vehicles, one vehicle to hold the DUT receiver and a stationary vehicle to hold the base receiver). The vehicle holding the DUT receiver may also include a reference GNSS receiver that includes (or is coupled to) an inertial measurement unit or inertial navigation system (INS) that provides dead reckoning functionality. FIG. 5A shows these GNSS receivers being deployed in an urban canyon 501, such as an urban downtown (e.g., the financial district of San Francisco or many different portions of Manhattan or other major cities). The environment in the urban canyon 501 includes many streets or paths, such as streets 507, 508, 509, and 510, and these streets are surrounded by buildings 511, 513, 515, 517, 519, 521, 523, 525, and 527. The dense collection of tall buildings tends to create a difficult environment for a GNSS receiver to operate accurately due to very high multipath effects. A base receiver 503 can be set up at a stationary and known position (e.g., at the top of the tallest building in the urban canyon 501 with a clear, unobstructed view of the entire sky above the horizon and the GNSS SVs in the sky); the base receiver 503 can be a reference quality GNSS receiver (although receivers with atomic clocks are not required). Alternatively, the base GNSS receiver can be positioned at a stationary, known location near the urban canyon with a clear, unobstructed view of the entire sky above the horizon and the GNSS SVs in the sky). The DUT receiver (e.g., DUT receiver 557) is mounted on a vehicle 505 that will move through the urban canyon 501 to collect data that will be used to generate the training data (e.g., the extracted EPL corrections based on the collected data). The vehicle 505 is moved through the urban canyon while the DUT receiver (e.g., DUT receiver 557) in the vehicle 505 collects GNSS data at the same time that the base receiver 503 collects GNSS data. For example, the vehicle 505 holding the DUT receiver is driven through most or all of the streets in at least a portion of the urban canyon 501 while the DUT receiver in vehicle 505 receives and collects GNSS data (as described herein) and while the base GNSS receiver 503 receives and collects GNSS data. FIG. 5B shows an example of the DUT receiver 557 in vehicle 505. The DUT receiver 557 is coupled, through a signal splitter 555, to a high quality GNSS antenna 553 that is mounted on the roof 551 of the vehicle 505. The DUT receiver 557 receives GNSS signals through the GNSS antenna 553 and measures pseudoranges and performs other measurements and stores this data in storage 565 while the vehicle is moved through the urban canyon 501. The DUT receiver 557 in this embodiment shares the GNSS antenna 553 with the reference GNSS receiver 559; in an alternative embodiment, the GNSS receiver 559 may be co-located with the DUT receiver 557 on the same vehicle but they do not share a GNSS antenna. In one embodiment, the GNSS receiver 559 is coupled to an inertial navigation system (INS) 561 that provides dead reckoning functionality and is also coupled to an odometer system 563. As is known in the art, the INS can include a set of motion and rotation sensors (such as a set of accelerometers and gyroscopes) that, once initialized with an accurate position, can maintain a position solution (e.g., measured in latitude and longitude) while the vehicle 505 moves through the urban canyon 501 or other environments. GNSS receivers with integrated INS are available from, for example, NovAtel, Inc. of Calgary, Canada. Over a short period of time, the position solution from the INS (e.g., a high quality INS) can be relatively accurate. The outputs from the INS 561 and the odometer system 563, over the period of time during this movement of vehicle 505, can be stored in storage 567 for use in processing the collected data. This stored position solution data from the INS, time tagged with GNSS constellation time by the reference receiver in the vehicle, can be considered truth position data which can be used to compute the true (LOS or geometric) pseudorange to each GNSS SV from the DUT receiver. The position and pseudorange outputs from the GNSS receiver 559 can also be stored in the storage 567 for later processing of the collected data.

The method shown in FIG. 6A can use the system shown in FIGS. 5A and 5B. In operation 601, the base receiver (e.g., base receiver 503) is set up at a static, fixed location that has a known position near an environment (e.g., urban canyon 501) where the DUT receiver will be moving; in the example in FIG. 5A, the base receiver 503 is positioned on top of the tallest building (building 513) in the urban canyon 501. The known position at the top of the building can be determined from GPS L1/L2 radio signals received by the base receiver and processed with NovAtel Inertial Explorer software or survey data, etc. This position places the base receiver in proximity to the vehicle 505. The base receiver should be placed at a stationary position that is near the environment where the DUT receiver will be collecting data, and that stationary position should have an unobstructed view of the entire sky above the horizon (what can be referred to as an "open sky condition" or "open sky environment"). This unobstructed view guarantees that the base receiver's reception of GNSS signals will be free of multipath effects.

In operation 603, the DUT receiver (e.g., DUT receiver 557) is set up in a vehicle (e.g., vehicle 505) that will travel through the environment, and a third GNSS receiver with an INS (e.g., reference receiver 559 with INS 561) is also included in the vehicle (e.g., as shown in FIG. 5B). The INS is initialized in operation 605 with the current known position of the vehicle (which may be obtained from GPS L1/L2 radio signals received by the base receiver and processed with NovAtel Inertial Explorer software or survey data, maps, etc.). Then data collection can begin in operation 605 while the vehicle moves through the environment; during data collection, the DUT receiver receives and processes GNSS signals from a set of GNSS SVs in one or more GNSS constellations, and the base receiver at the same time also receives and processes those GNSS signals from the same set of GNSS SVs. The vehicle can travel through one or more urban canyons and other types of obstructed environments while this data is collected, and multiple different data collection sessions may be conducted over several days. It is preferable that multiple GNSS constellations be used (e.g., the GPS constellation, the Galileo constellation, and the Beidou constellation) so that GNSS signals from many GNSS SVs can be received and processed; this is particularly desirable when the pivot SV approach (described below) is used to extract EPL corrections because having more GNSS SVs available increases the probability of successfully finding a pivot SV when the EPL extractions occur. In one embodiment, after the vehicle has completed its tour of the environment (e.g., the vehicle has finished travelling through its planned route through urban canyon 501), the vehicle can be driven, in operation 607, to an open sky environment (where the DUT receiver and the reference receiver on the vehicle can receive GNSS signals with no obstructions to the sky) and then the DUT receiver and the reference receiver (e.g., reference receiver 559 which can be a GNSS receiver from NovAtel, Inc.) can receive and process GNSS signals for a sufficient period of time to allow post-processing software (e.g., Inertial Explorer software from NovAtel, Inc.) to perform forward and backward smoothing of clock errors in the DUT receiver and reference receiver on the vehicle. Operation 609 is, in one embodiment, an optional operation that is not required to be performed. When the base receiver is in a stationary vehicle, the vehicle 505 can be driven to the location of this stationary vehicle to perform operation 607 if operation 607 is performed.

After the data has been collected in operation 605, the collected data can be retrieved and processed, in operation 609, to calculate correction factors that can be used to derive EPL corrections based on the received GNSS signals. These calculations to derive EPL corrections can be referred to as EPL extractions from the collected data, and two methods (e.g., a method shown in FIG. 6B and a method shown in FIG. 6C) are presented to perform these extractions from the collected data. Prior to describing these EPL extraction methods, a description of the collected data will now be provided.

The base receiver (e.g., the base receiver 503) collects and stores pseudoranges that are time tagged (with GNSS constellation time) for each GNSS L5 signal in each constellation that is also received and used by the DUT receiver. The base receiver also determines its accurate position by using (in one embodiment) a carrier phase based position solution using a commercial software package (e.g., NovAtel's Inertial Explorer in static mode or NRCAN from Natural Resources of Canada), and to get this accurate position, the base receiver collects L1 and L2 GPS pseudorange measurements and carrier phase data measurements for at least 20 minutes to 30 minutes. The base receiver hence receives (in one embodiment) GPS L1/L2 GPS signals and also receives GPS/Galileo/Beidou L5 GNSS signals from these three L5 GNSS constellations (which are also used by the DUT receiver).

The DUT receiver (e.g., DUT receiver 557) also receives GNSS signals from these 3 L5 GNSS constellations, and the DUT receiver collects and stores pseudoranges (e.g., in the form of correlation vectors) that are time tagged (with GNSS constellation time) for each GNSS L5 signal that is received the DUT receiver.

The reference receiver (reference receiver 559 that is co-located with the DUT receiver) receives GPS L1/L2 GPS signals and INS measurements/data and stores position measurements from these data; this collected data from this reference receiver is processed (e.g., using NovAtel's Inertial Explorer software) to provide accurate position data of the vehicle 505, each accurate position data time tagged with GNSS constellation time. Thus, the reference receiver on the vehicle 505 can provide truth position data of the GNSS antenna on the vehicle at a series of times (the GNSS time tags) during the collection of the data while the vehicle 505 moves through the environment. This truth position data can be used to compute the true (geometric) pseudorange (a LOS pseudorange) at the GNSS antenna on the vehicle. The collected data from the base receiver can be used, as described below, to compute correction factors for each L5 signal, and these correction factors can correct for propagation and system errors (e.g., ionospheric errors, tropospheric errors, SV clock errors, orbit errors, etc.). From the computed correction factors from the base receiver and the collected data from the DUT receiver, a correction of the measured pseudorange at the DUT receiver (using corrections derived from the base receiver) can be computed. Then, the EPL correction can be computed from the difference between the computed pseudorange at the DUT (after the corrections derived from the base receiver) and the computed true pseudorange at the DUT receiver.

Figure 6B:
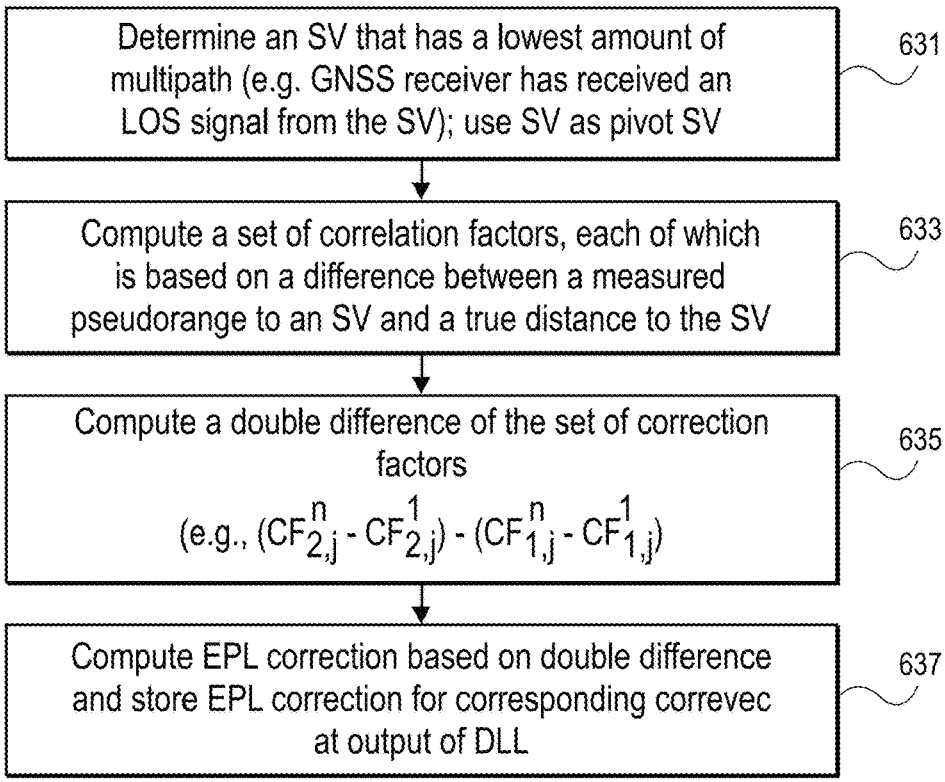
FIG. 6B is a flow chart that shows a method for extracting EPL corrections from training data according to an embodiment that uses a pivot satellite (pivot SV), which is an SV that provides an LOS signal to the DUT receiver (or the signal that has the lowest multipath at the DUT receiver).

One method for extracting EPL corrections from the collected data is shown in FIG. 6B. In operation 631 in FIG. 6B, a data processing system (which performs the EPL extractions) determines, from the collected data, an SV that has the lowest amount of multipath (MP); this SV can be referred to as a pivot SV. This determination is normally performed on a periodic basis, such as a period defined by a GNSS PRN code epoch (i.e., for each such epoch the determination is performed). If the DUT receives an LOS signal from an SV and there are no multipath effects for that signal (e.g., no received reflections of that signal), then that signal would likely be the SV with the lowest amount of MP. A data processing system can use either a LOS/NLOS classifier (machine learning classifiers that are known in the art to classify signals as either LOS or NLOS) to identify such SV or use a method described below to identify a pivot SV. In operation 633, the data processing system computes a set of correction factors from the collected data; each of the correction factors is based on a difference between a measure pseudorange to an SV and a true distance to the SV. Then in operation 635, the data processing computes a double difference of the correction factors (shown in operation 635). Further details about this computation of the double difference is provided below. This double difference uses data from the base GNSS receiver to correct or remove the common system and propagation errors. Then in operation 637, the data processing system computes the EPL correction based on the computed double difference for the corresponding correlation vector, and the EPL correction is stored with the associated correlation vector for use in training the model. Further details about this method shown in FIG. 6B is provided below.

Figure 6C:
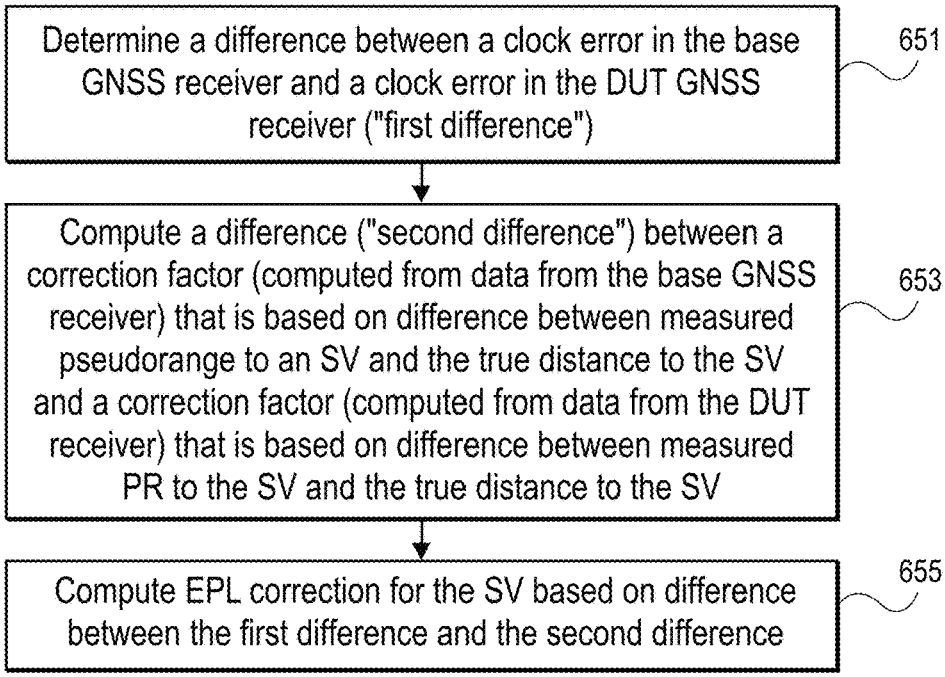
FIG. 6C is a flow chart that shows a method for extracting EPL corrections from training data according to an embodiment that does not use a pivot SV.

Another method for extracting EPL corrections from the collected data is shown in FIG. 6C. The method shown in FIG. 6C does not use a pivot SV, so no calculations for finding pivot SVs are needed; this method in FIG. 6C also is a more robust method that will work in cases where there no pivot SVs (such as deep urban canyons) or it is difficult to find a pivot SV. Moreover, this method avoids having to continuously switch from pivot to pivot SV as the DUT receiver moves. In operation 651 in FIG. 6C, a data processing system (which performs the EPL extractions) determines, from the collected data, a difference between a clock error in the base GNSS receiver and a clock error in the DUT receiver; this difference can be referred to as a first difference and represents a combined clock error difference between the two receivers. Then in operation 653, the data processing system computes a difference (referred to as a second difference) between a first correction factor and a second correction factor. The first correction factor is computed from data from the base GNSS receiver and is based on the difference between a measured pseudorange (measured at the base receiver) to an SV and the true distance to the SV; the second correction factor is computed from collected data from the DUT receiver and is based on the difference between a measured pseudorange (measured at the DUT receiver) to the SV and the true distance to the SV. In operation 655, the data processing can compute the EPL correction for the SV based on the difference between the first difference and the second difference. Further details about this method shown in FIG. 6C is provided below.

The following description provides examples of computations that can be used to perform EPL extractions, and these computations can be used in one or both (as indicated below) of the methods shown in FIGS. 6B and 6C. First, a correction factor (CF) for the base reference receiver can be based on the following simplified observable for the base reference receiver and can be used in both methods (in FIGS. 6B & 6C):

The simplified observable for the base reference receiver is:

$$p_{ref,j}^s = \rho_{ref}^s + T_{ref}^s + c[dt_{ref,j}^s + d_{ref,j}^s] - c[dt^s - dt_j^s] + \mu_{ref,j}^s + M_{ref,j}^s$$

Where:

$p_{ref,j}^s(t)$: Pseudo Range measured on constellation S, from satellite s, to receiver ref, at signal j $\rho_{ref}^s$: true distance from constellation S, satellite s to receiver r $T_{ref}^s$: Tropo delay for constellation S, satellite s to receiver r $dt_{ref}$: ref receiver clock error $d_{ref,j}^s$: ref receiver code hardware bias on constellation S at signal j (same for all channels, all satellites at same signal j on CDMA)

$dt^s$: S constellation clock error (usually corrected from ephemeris by af0,af1,af2)

$d_j^s$: absolute satellite s hardware bias (related to DCB, Differential Code Bias)
$\mu_j$: Ionospheric coefficient (depends on signal frequency j)
$I_{ref}^s$: Iono delay on constellation S from satellite s to receiver r (depends only on positions)
$\mathcal{M}_{ref}^s$: multipath error, local to receiver r, observed at signal j for satellite s of constellation S
c: speed of light As it is the base reference receiver, the environment is assumed to be open sky condition with no multipath:

$$\mathcal{M}_{ref,j}^s \approx 0 \quad \text{(open sky)}$$

We will use the following definition for the CF (reference and rover receivers alike):

$$CF_{ref,j}^s \stackrel{def}{=} \rho_{ref}^s - p_{ref,j}^s - cdt^s$$

Note: the subtraction—$c\, dt^s$ is only for reducing all CF at (usually) small values. This term will have to be added again when correction a set of measurements.

The correction terms included in the correction factor are:

$$CF_{ref,j}^s = T_{ref}^s - c[dt_{ref,j} + d_{ref,j}^s] + c[dt^s - dt_j^s] - \mu_j I_{ref}^s - cdt^s$$

Second, a correction factor (CF) for the DUT receiver can be based on the following and can be used in both methods (in FIGS. 6B & 6C): By default, if we are computing only the EPLs for GPS we are using the GPS IF(11,L2) signal as reference.
At the DUT receiver on satellite s:
Measure $p_{rov,j}^s$, and compute $p_{rov}^s$:
For each measurement at the DUT receiver, form the combination below:

$$p_{rov,j}^s - \rho_{rov}^s + CF_{ref,j}^s + cdt^s =$$
$$\rho_{rov}^s - \rho_{rov}^s + T_{rov}^s + c[dt_{rov,j} + dt_{rov,j}^s] - c[dt^s - dt_j^s] + \mu_j I_{rov}^s + \mathcal{M}_{rov,j}^s - T_{ref}^s - c[dt_{ref,j} + dt_{ref,j}^s] + c[dt^s - dt_j^s] - \mu_j I_{ref}^s - cdt^s + cdt^s = \mathcal{M}_{rov,j}^s + dt_{rov,ref}$$

With $$dt_{rov,ref} = c.[dt_{rov,j} - dt_{ref,j}] + c.[d_{rov,j}^s - d_{ref,j}^s] \quad \text{And}$$

$$K_{rov,j}^s = p_{rov,j}^s - \rho_{rov}^s + CF_{ref,j}^s + cdt^s = CF_{ref,j}^s - CF_{rov,j}^s = c.dt_{rov,ref} + \mathcal{M}_{rov,j}^s$$

Note 1: this is not the usual correction for correcting the PR for all error terms.

The subtraction with $p_{rov,j}^s$ creates a geometry-free combination, unsuitable for position computation.

Note 2: the term $dt_{rov,ref}$ is the lumped combination of reference and rover clock errors.

Note 3: if ref and DUT receiver are not identical, the $dt_{rov,ref}$ term will absorb clock errors $dt_{rov,j} - dt_{ref,j}$ but also Inter Signal Bias differences between receivers $d_{rov,j}^s - d_{ref,j}^s$.
If we are interested in EPL's for a single constellation there is NO extra correction to apply if ref and rov receivers are not of the same brand.
An alternative expression of the double difference of the CF's is:

$$K_{rov,j}^s \stackrel{def}{=} CF_{ref,j}^s - CF_{rov,j}^s = \mathcal{M}_{rov,j}^s + c.dt_{rov,ref}$$

$$K_{rov,j}^1 = \mathcal{M}_{rov,j}^1 + c.dt_{rov,ref}$$

$$K_{rov,j}^m = \mathcal{M}_{rov,j}^m + c.dt_{rov,ref}$$

Figure 8:
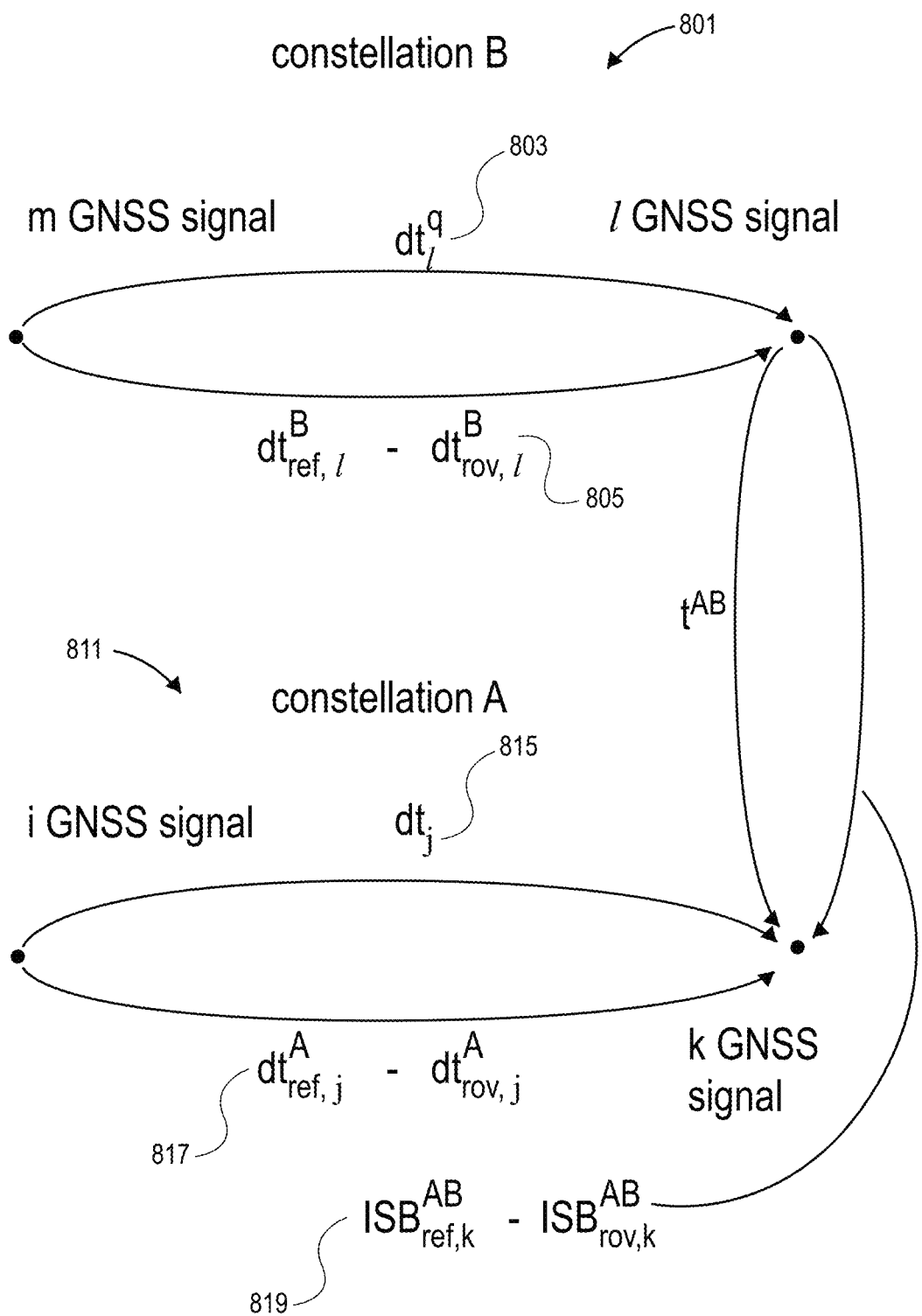
FIG. 8 shows an example of corrections that can be used when multiple constellations are used with the one or more embodiments described herein.

If the DUT receiver and the base reference receiver are different or if multiple GNSS constellations are used, then both methods (6B & 6C) should correct for inter signal bias (ISB) (as illustrated in FIG. 8).

The reference pseudo range measured on constellation B, at signal k can be expressed as function of the GPS receiver time error $$p_{ref,k}^q = p_{ref,m}^q + c[ISB_{ref,k}^{AB} - t^{AB}] =$$
$$\rho_{ref}^q + T_{ref}^q + c[dt_{ref}(t_k^A) + dt_{ref,l}^B] - c[dt^q - dt_l^q] + \mu_l I_{ref}^q + c[ISB_{ref,k}^{AB} - t^{AB}]$$

$$CF_{ref,k}^q \stackrel{def}{=} \rho_{ref}^q - p_{ref,k}^q - cdt^q$$

$$CF_{ref,k}^q =$$
$$-T_{ref}^q - c[dt_{ref}(t_k^A) + d_{ref,l}^B] + c[dt^q - dt_l^q] - \mu_k I_{ref}^q - c[ISB_{ref,k}^{AB} - t^{AB}] - cdt^q$$

$$p_{rov,k}^q = p_{rov,m}^q + c[ISB_{rov,k}^{AB} - t^{AB}] =$$
$$\rho_{rov}^q + T_{rov}^q + c[dt_{rov}(t_k^A) + dt_{rov,l}^B] - c[dt^q - dt_l^q] + \mu_l I_{rov}^q + c[ISB_{rov,k}^{AB} - t^{AB}]$$

$$CF_{rov,k}^q \stackrel{def}{=} \rho_{rov}^q - p_{rov,k}^q - cdt^q$$

$$p_{rov,k}^q - \rho_{rov}^q + CF_{ref,k}^q + cdt^q = CF_{ref,k}^q - CF_{rov,k}^q \approx$$
$$+ c[dt_{rov}(t_k^A) + dt_{ref}(t_k^A)] - c[dt_{ref,l}^B - dt_{rov,l}^B] - c[ISB_{ref,k}^{AB} - ISB_{rov,k}^{AB}]$$

If ref and rover receiver are identical:
The only remaining term is the difference of the receiver clock errors.

If ref and rover are different (such as Novatel and Spirent): The term $-c[dt_{ref,l}^B - dt_{rov,l}^B] - c[ISB_{ref,k}^{AB} - ISB_{rov,k}^{AB}]$ needs to be evaluated separately and corrected in the CF difference.

For other constellations than GPS, the K term becomes:

$$K_{rov,j}^n \stackrel{def}{=} CF_{ref,j}^n - CF_{rov,j}^n - c[dt_{ref,l}^B - dt_{rov,l}^B] - c[ISB_{ref,k}^{AB} - ISB_{rov,k}^{AB}] =$$
$$\mathcal{M}_{rov,j}^s + c.dt_{rov,ref}$$

FIG. 8 shows an example of a computation of inter signal bias (ISB) 819. In this example, there are two GNSS constellations (801 and 811); constellation 801 includes at least two signals (m GNSS and 1 GNSS signals), and constellation 811 includes at least two signals (j GNSS and k GNSS signals). The corrections shown in FIG. 8 include a clock error correction 803 for SV/system errors in constellation B (constellation 801) and a clock error correction 815 for SV/system errors in constellation A (constellation 811). The corrections shown in FIG. 8 also include clock error corrections 805 for receiver errors associated with constellation B and clock error corrections 817 for receiver errors associated with constellation A. Constellations A and B may be two constellations from the group of existing GNSS constellation such as the GPS constellation, the Galileo constellation, the Beidou constellation, and the GLONASS constellation.

The following description uses the above definitions of correction factors and computations to perform EPL extractions in either one of the two methods in FIGS. 6B and 6C.

Pivot SV method with double difference (FIG. 6B):

The pivot satellite is re-estimated at every epoch, and the method can deal with situations where the pivot becomes obstructed, or a better choice comes up.

1)—compute all $K_{rov,j}^n$ for all constellations, all satellites

2)—find the 5 satellite pairs across all measurements and all constellations with the smallest difference between sums ($K_{rov,j}^n + K_{rov,k}^m$) These are the less MP impacted pairs of satellites.

$$K_{rov,j}^n + K_{rov,k}^m \approx \mathcal{M}_{rov,j}^n + c \cdot dt_{rov,ref} + \mathcal{M}_{rov,k}^m + c \cdot dt_{rov,ref} \approx 2 \cdot c \cdot dt_{rov,ref}$$

3)—computes the median "c. $\widehat{dt}_{rov,ref}$" of the sequence of sums for these 5 pairs.

This is a good estimate of 2 times combined clock error (see Appendix 1 for justification).

4)—estimate the clock estimate-based MP for all satellites by computing:

$$\mathcal{M}_{rov,j}^1 = K_{rov,j}^1 - c \cdot \widehat{dt}_{rov,ref}$$

$$\ldots$$

$$\mathcal{M}_{rov,j}^m = K_{rov,j}^m - c \cdot \widehat{dt}_{rov,ref}$$

5)—find the lowest absolute MP and use the corresponding satellite as pivot.

6)—Form all K Double differences with the pivot satellite.

$$\mathcal{M}_{rov,j}^n = K_{rov,j}^n - K_{rov,j}^{pivot}$$

This is the estimate of the MP for the satellite n.

If $MP_{pivot} > Thr$, the estimation of MP is disabled and returns NaN's for all satellites.

Note 1: The pivot satellite MP is of course found at "zero".

Note 2: It is possible to continue the MP estimation, even with $MP_{ind}$ is larger than the threshold, by using the alternate formula for MP estimation:

$$\mathcal{M}_{rov,j}^n = K_{rov,j}^n - K_{rov,j}^{pivot} + (K_{rov,j}^{pivot} - c \cdot \widehat{dt}_{rov,ref})$$

That is an indirect method that goes back to the first method, "clock-error" based estimates.

$$\mathcal{M}_{rov,j}^1 = K_{rov,j}^1 - c \cdot \widehat{dt}_{rov,ref}$$

$$\ldots$$

$$\mathcal{M}_{rov,j}^m = K_{rov,j}^m - c \cdot \widehat{dt}_{rov,ref}$$

Single difference method with estimation of clock error (FIG. 6C):

1)—compute all $K_{rov,j}^n$ for all constellations, all satellites at each measurement epoch.

2)—find satellite pairs across all measurements and all constellations.

3)—for each sat pair compute the sum:

$$K_{rov,j}^n + K_{rov,k}^m \approx \mathcal{M}_{rov,j}^n + c \cdot dt_{rov,ref} + \mathcal{M}_{rov,k}^m + c \cdot dt_{rov,ref} \approx 2 \cdot c \cdot dt_{rov,ref}$$

4)—Estimate the clock error over all sum terms $$dt_{rov,ref} = \frac{1}{2c} \cdot \text{median}\left(\{K_{rov,j}^n + K_{rov,k}^m\}\right)$$

5)—Compute in parallel a Multipath Indicator as the mean of sum of the 5 pairs of satellites with smallest K factor difference $$MP_{ind} = \frac{1}{5} \sum_{p=1}^{5} |K_{rov,j}^n - K_{rov,k}^m|$$

With p=[(n1, m1,j1,k1), ... (n2,m2,j2,k2), ... (n5,m5,j5, k5)]

If $MP_{ind} > MP_{thr}$ do not retain the current $dt_{rov,ref}$ value

6)—Optionally Forward and Backward smooth the retained $dt_{rov,ref}$ using a Rauch,Tung,Striebel KF smoother(2states, offset and drift). The MPind is used for rejecting the large $dt_{rov,ref}$ and updating the estimate based on internal state variables 6)—Compute all MP individual values by subtracting smoothed clock error to each single difference term, If no clock smoothing, limit the computation for each epoch with $MP_{ind} < MPthr$ This method works quite well and is recommended for Spirent data, that are raw pseudo ranges (i.e. the clock error is not estimated and corrected along position determination in the reported pseudoranges). There is no common clock error term introduced by the MP. The smoothing does a particularly good job at smoothing the clock. In this case we estimate maximum residual clock error at −/+1 m regardless of the MP severity.

For Spirent data(raw pseudoranges), there is no need to reject any data depending on the $MP_{ind}$ value, and the smoothing should be enabled.

If this method is applied to Novatel data (that corrects pseudoranges), a threshold $MP_{ind} < 1.5$ is recommended, and the clock smoothing should be disabled (all delta between raw clock and smoothed clock will impact all MP estimations with a common mode). This method is not recommended for Novatel data.

An alternative approach to estimating the clock error in the method of FIG. 6C is presented below. Differencing 2 arbitrary K factors will eliminate the clock error, and will leave only the MP difference $$K_{rov,j}^n - K_{rov,k}^m = \mathcal{M}_{rov,j}^1 - \mathcal{M}_{rov,j}^m$$

This is a good method for creating a MP index by summing the $|\mathcal{M}_{ro,j}^1 - \mathcal{M}_{rov,j}^m|$, (what is done anyways on both methods), but not for estimating the clock error.

In one embodiment, use the sum of the K factors.

$$K_{rov,j}^n + K_{rov,k}^m \approx \mathcal{M}_{rov,j}^n + \mathcal{M}_{rov,k}^m + 2 \cdot c \cdot dt_{rov,ref}$$

But retain only the sums with minimum MP on both satellites.

The absolute value of a given sum is irrelevant, as the lumped clock can be either small or very large. For the lowest MP sums, the sums will be close to each other $2 \cdot c \cdot dt_{rov,ref}$). The algorithm becomes:

1. Form ALL sums of 2 satellites taken 2 by 2 (over all constellations)
2. Computes the difference of the sums,
3. select the 5 lowest difference of sums.
4. These will be used for the rest of the algorithm, beginning with the calculation of the estimated clock error ($dt_{rov,ref}$).

Practically the algorithm can be implemented as follows (to avoid computing and processing 20×20 sums as in a typical m=20 satellite case):

1. Sort all m K factors from the lowest to the highest.
2. Computes all sums of 2 consecutive ordered K factors. They will always be the lowest valued m−1 sums we can get over all combinations.
3. Computes the differences of all consecutive sums.
4. Sort the differences of the sums.
5. use the 5 smallest for the rest of the algorithm, beginning with the calculation of the estimated clock error ($dt_{rov,ref}$).

This only works for the K factors all the same sign, which is almost always the case (large clock errors in the order of 1e4 to 1e5, and MP in the order of 1 to 1e2). If the K factors are not of same sign, a second sorting with the absolute values of the K factors needs to be added and analyzed for the smallest sum difference.

For the final clock error determination on the 5 selected sums, we use the fact that there are 2 types of MP's:
LOS+NLOS multipath, that will fall within the MP sensitivity of the DLL
NLOS only multipath. If the MP is strictly due to NLOS, the values will be much higher, and always on the positive side.

Figure 9:
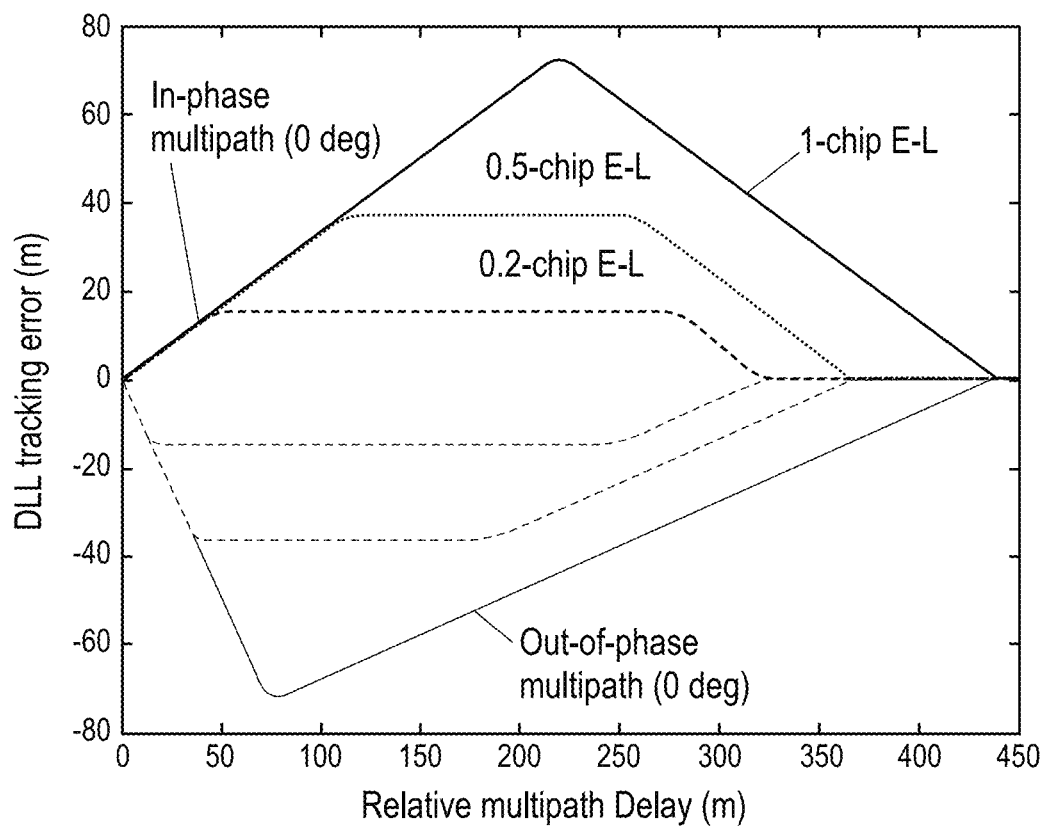
FIG. 9 shows an example of a typical multipath envelope error.

For the LOS+NLOS, a typical MP envelope error is something like what is shown in FIG. 9 (this is only valid for GPS BPSK, but similar in symmetry around zero error for all the other signals). If we assume that the relative phase between LOS and NLOS is equally distributed between 0 and 360 degrees, the locus of all DLL tracking errors of the DLL will move on a vertical line at the relative delay, between the maximum and the minimum value of the envelope, the tracking error will be statistically roughly half of the time above the zero line, and half of the time below the zero line.

To find a good estimate of the clock error, we first assume that the 5 sums with minimum difference are distributed in both the positive and negative sides (LOS+NLOS at low MP amplitude), and that their values will be quite close to the 0-tracking error. By extracting the median, the impact of the large values on the clock estimates is limited, and the method can use the low MP cases, that will be grouped around twice the clock error estimate.

While this description has focused on GNSS SVs and GNSS signals from GNSS SVs, the embodiments described herein can also be used with GNSS-like signals from terrestrial (e.g., ground based) transmitters of GNSS-like signals, such as pseudolites ("pseudo-satellite"). Thus, the embodiments described herein can be used in systems that use such terrestrial transmitters and receivers designed to receive and process GNSS-like signals from such terrestrial transmitters. The phrase "GNSS signals" will be understood to include such GNSS-like signals, and the phrase "GNSS SVs" will be understood to include such terrestrial transmitters.

What is claimed is:

1. A method of operating a global navigation satellite system (GNSS) receiver, the method comprising:
receiving GNSS signals from one or more GNSS satellites (SVs);
extracting a set of features from the received GNSS signals, the set of features being predetermined based on a trained model in the GNSS receiver;
applying the set of features as an input to the trained model;
generating, by the trained model, a set of one or more excess path length (EPL) corrections to correct one or more pseudorange measurements made by the GNSS receiver.

2. The method as in claim 1, wherein the set of features comprises: (1) correlation vector features from a set of successive correlation vectors from correlators, in the GNSS receiver, for GNSS signals from a GNSS SV; (2) a mutual probability distribution function (pdf) data of the relative delay and relative amplitude from each of the correlators; (3) other features relating to the GNSS receiver or GNSS SV.

3. The method as in claim 2, wherein the correlation vector features comprise one or more of: (1) relative amplitude of local maximum points in a correlation vector; (2) relative delay of peaks in a correlation vector; (3) a width of a strongest peak in a correlation vector; or (4) a number of strong peaks in a correlation vector.

4. The method as in claim 3, wherein the mutual pdf is in a 2D (two dimension) matrix format.

5. The method as in claim 4, wherein the other features comprise one or more of: (1) an elevation of a GNSS SV; (2) a signal to noise ratio (SNR) of a measured pseudorange; (3) a type of antenna used to receive the GNSS signals; (4) a tracking mode of the GNSS receiver; or (5) a tracking loop configuration of the GNSS receiver.

6. The method as in claim 5, wherein the trained model comprises a set of one or more neural networks, and wherein the set of one or more neural networks comprise: (1) a first convolution neural network (CNN) to receive as inputs the mutual pdf data; (2) a second CNN to receive as inputs the correlation vector features; and (3) a first neural network to receive the other features.

7. The method as in claim 6, wherein the method further comprises:
pruning data in the set of features;
balancing data in the set of features;
scaling data in the set of features.

8. The method as in claim 1 wherein the trained model comprises a set of one or more neural networks.

9. The method as in claim 1 wherein each of the one or more pseudoranges is corrected by subtracting a corresponding EPL correction from a measured pseudorange from a GNSS SV, and wherein the GNSS signals are wideband GNSS signals that have a chipping rate that exceeds a chipping rate for L1 GPS signals, and wherein the measured pseudorange is measured in a delay locked loop in the GNSS receiver and wherein the one or more EPL corrections are derived based on outputs at the delay locked loop (DLL) which is a pseudorandom noise (PRN) tracking loop to track pseudoranges in the GNSS receiver.

10. The method as in claim 1, wherein each of the one or more corrected pseudoranges is used in position solution calculations by a position engine, and wherein the set of one or more EPL corrections correct for multipath reflections of GNSS signals in an urban canyon that surrounds the GNSS receiver.

11. A non-transitory machine readable medium storing executable program instructions which when executed by a data processing system cause the data processing system to perform a method, the method comprising:
extracting a set of features from received global navigation satellite system (GNSS) signals, the set of features being predetermined based on a trained model in a GNSS receiver;
applying the set of features as an input to the trained model;

generating, by the trained model, a set of one or more excess path length (EPL) corrections to correct one or more pseudorange measurements made by the GNSS receiver.

12. The non-transitory machine readable medium as in claim 11, wherein each of the one or more pseudoranges is corrected by subtracting a corresponding EPL correction from a measured pseudorange from a GNSS SV, and wherein the GNSS signals are wideband GNSS signals that have a chipping rate that exceeds a chipping rate for L1 GPS signals, and wherein the measured pseudorange is measured in a pseudorange measurement system in the GNSS receiver and wherein the one or more EPL corrections are derived based on outputs from the pseudorange measurement system in the GNSS receiver, and wherein the set of features comprises: (1) correlation vector features from a set of successive correlation vectors from correlators, in the GNSS receiver, for GNSS signals from a GNSS SV; (2) a mutual probability distribution function (pdf) data of the relative delay and relative amplitude from each of the correlators; (3) other features relating to the GNSS receiver or GNSS SV.

13. The non-transitory machine readable medium as in claim 12, wherein the correlation vector features comprise one or more of: (1) relative amplitude of local maximum points in a correlation vector; (2) relative delay of peaks in a correlation vector; (3) a width of a strongest peak in a correlation vector; or (4) a number of strong peaks in a correlation vector.

14. The non-transitory machine readable medium as in claim 13, wherein the mutual pdf is in a 2D (two dimension) matrix format.

15. The non-transitory machine readable medium as in claim 14, wherein the other features comprise one or more of: (1) an elevation of a GNSS SV; (2) a signal to noise ratio (SNR) of a measured pseudorange; (3) a type of antenna used to receive the GNSS signals; (4) a tracking mode of the GNSS receiver; or (5) a tracking loop configuration of the GNSS receiver.

16. The non-transitory machine readable medium as in claim 15,
wherein the trained model comprises a set of one or more neural networks, and wherein the set of one or more neural networks comprise: (1) a first convolution neural network (CNN) to receive as inputs the mutual pdf data; (2) a second CNN to receive as inputs the correlation vector features; and (3) a first neural network to receive the other features.

17. The non-transitory machine readable medium as in claim 16, wherein the method further comprises:
pruning data in the set of features;
balancing data in the set of features;
scaling data in the set of features.

18. The non-transitory machine readable medium as in claim 11, wherein the trained model comprises a set of one or more neural networks.

* * * * *